(12) United States Patent
Zhuang

(10) Patent No.: US 12,212,394 B2
(45) Date of Patent: Jan. 28, 2025

(54) INFORMATION TRANSMISSION METHOD AND APPARATUS AND TERMINAL DEVICE

(71) Applicant: Huawei Technologies Co., Ltd., Shenzhen (CN)

(72) Inventor: Hongcheng Zhuang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 229 days.

(21) Appl. No.: 18/001,787

(22) PCT Filed: May 19, 2021

(86) PCT No.: PCT/CN2021/094608
§ 371 (c)(1),
(2) Date: Dec. 14, 2022

(87) PCT Pub. No.: WO2021/254078
PCT Pub. Date: Dec. 23, 2021

(65) Prior Publication Data
US 2023/0261718 A1 Aug. 17, 2023

(30) Foreign Application Priority Data
Jun. 16, 2020 (CN) .......................... 202010545821.9

(51) Int. Cl.
*H04B 7/06* (2006.01)
*H04B 7/0404* (2017.01)
*H04B 7/08* (2006.01)

(52) U.S. Cl.
CPC ......... *H04B 7/0691* (2013.01); *H04B 7/0404* (2013.01); *H04B 7/0874* (2013.01)

(58) Field of Classification Search
CPC H04B 7/04013; H04B 7/0404; H04B 7/0608; H04B 7/0617; H04B 7/0626; H04B 7/0691; H04B 7/0695; H04B 7/06956; H04B 7/0814; H04B 7/0825; H04B 7/086; H04B 7/0874; H04B 7/088
See application file for complete search history.

(56) References Cited

U.S. PATENT DOCUMENTS

| | | | | |
|---|---|---|---|---|
| 11,671,167 B2 * | 6/2023 | Bengtsson | ............. | H04B 7/145 455/25 |
| 2013/0148636 A1 | 6/2013 | Lum et al. | | |
| 2021/0302561 A1* | 9/2021 | Bayesteh | ................ | G01S 13/42 |

(Continued)

FOREIGN PATENT DOCUMENTS

| | | | | |
|---|---|---|---|---|
| CN | 111010219 A | * | 4/2020 | |
| CN | 111163515 A | * | 5/2020 | |
| WO | WO-2021155927 A1 | * | 8/2021 | ........... H04B 7/0604 |

OTHER PUBLICATIONS

Qurrat-Ul-Ain Nadeem, et al, "Intelligent Reflecting Surface Assisted Multi-User MISO Communication: Channel Estimation and Beamforming Design," IEEE Open Journal of the Communications Society, IEEE, vol. 1, May 6, 2020, pp. 661-680, XP011792712.

*Primary Examiner* — Siu M Lee
(74) *Attorney, Agent, or Firm* — Conley Rose, P.C.

(57) ABSTRACT

In an information transmission process, a terminal device determines a first antenna unit to be assisted and uses a reconfigurable intelligent surface (RIS) module to assist the first antenna unit in transmitting target information by the RIS module generating an additional transmit beam or receive beam.

20 Claims, 12 Drawing Sheets

(56) References Cited

U.S. PATENT DOCUMENTS

| | | | |
|---|---|---|---|
| 2023/0198605 A1* | 6/2023 | Alkhateeb | H04B 7/15507 |
| | | | 370/315 |
| 2023/0208479 A1* | 6/2023 | Wang | H04B 7/0617 |
| | | | 375/262 |
| 2023/0208486 A1* | 6/2023 | Dai | H04B 7/04013 |
| | | | 370/315 |

* cited by examiner

INFORMATION TRANSMISSION METHOD AND APPARATUS AND TERMINAL DEVICE

CROSS-REFERENCE TO RELATED APPLICATIONS

This is a U.S. National Stage of International Patent Application No. PCT/CN2021/094608 filed on May 19, 2021, which claims priority to Chinese Patent Application No. 202010545821.9 filed on Jun. 16, 2020. Both of the aforementioned applications are hereby incorporated by reference in their entireties.

TECHNICAL FIELD

This application relates to the field of communications technologies, and in particular, to an information transmission method and apparatus and a terminal device.

BACKGROUND

An existing terminal device is usually a multi-standard terminal device, for example, includes a plurality of radio standards such as 2G, 3G, 4G, and 5G. As the radio standards increase, a used frequency is increasingly high, for example, sub-6 GHz and a millimeter wave frequency band of 5G NR. A high frequency band may bring a higher transmission rate because there is more bandwidth, but attenuation of radio signal transmission is also greater. As a result, uplink and downlink transmission performance of the terminal device is poor.

SUMMARY

Embodiments of this application provide an information transmission method and apparatus and a terminal device, to improve uplink and downlink transmission performance of the terminal device.

According to a first aspect, an embodiment of this application provides an information transmission method. A terminal device includes an RIS module, and the method includes: determining a first antenna unit to be assisted, where the terminal device includes at least two groups of antennas, a radio standard corresponding to each group of antennas is different from or the same as each other, each group of antennas includes at least one antenna, and the first antenna unit includes at least one antenna in any group of antennas; and transmitting target information by using the RIS module and the first antenna unit.

According to the information transmission method provided in this embodiment of this application, the RIS module is disposed in the terminal device. In an information transmission process, the terminal device determines the first antenna unit to be assisted, and uses the RIS module to assist the first antenna unit in transmitting the target information. Because the RIS module generates an additional transmit beam or receive beam, uplink or downlink signal quality of the terminal device is improved, so that uplink and downlink transmission performance of the terminal device is improved.

In this embodiment of this application, methods for determining the first antenna unit based on different working modes of the terminal device include the following several types:

Manner 1: When the terminal device works in a multi-connection mode, the first antenna unit is determined based on a signal coverage situation of the terminal device.

Specifically, when the terminal device is in weak coverage, a working antenna that is farthest from the RIS module is determined as the first antenna unit; or when the terminal device is shielded, a working antenna whose beam is shielded is determined as the first antenna unit, where the shielding situation is that a beam of at least one working antenna of the terminal device is shielded; or when the terminal device is in non-weak coverage and is not shielded, an antenna with a highest service priority is determined as the first antenna unit.

In the manner 1, that the terminal device transmits target information by using the RIS module and the first antenna unit includes: performing channel estimation on the RIS module to determine channel state information of the RIS module; and transmitting the target information based on the channel state information of the RIS module and channel state information of the first antenna unit.

In some embodiments, the transmitting the target information based on the channel state information of the RIS module and channel state information of the first antenna unit includes: sending a first signal by using the RIS module and the first antenna unit together based on the channel state information of the RIS module, the channel state information of the first antenna unit, and different reflection coefficients of the RIS module, and obtaining a strength of the first signal received by a receiver, where the strength of the signal received by the receiver is related to the reflection coefficients of the RIS module; then obtaining a target reflection coefficient of the RIS module based on the strength of the first signal received by the receiver, for example, determining, as the target reflection coefficient, a reflection coefficient of the RIS module existing when the strength of the first signal is maximum; and finally adjusting a channel of the RIS module based on the target reflection coefficient of the RIS module, and transmitting the target information by using a channel of the first antenna unit and the adjusted channel of the RIS module.

According to the information transmission method provided in this embodiment of this application, when the terminal device works in the multi-connection mode, the terminal device determines the first antenna unit based on the signal coverage situation of the terminal device, performs channel estimation on the RIS module to determine the channel state information of the RIS module, and finally transmits the target information based on the channel state information of the RIS module and the channel state information of the first antenna unit. In this way, when the terminal device works in the multi-connection mode, the RIS module assists the first antenna unit in transmitting the target information, so that transmission reliability of the target information and transmission performance of the terminal device are improved.

Manner 2: When the terminal device works in a single-connection mode, the first antenna unit is determined based on signal strengths of antennas in the at least two groups of antennas.

In some embodiments, in the manner 2, that the first antenna unit is determined based on signal strengths of antennas in the at least two groups of antennas includes: performing channel estimation on the RIS module to determine channel state information of the RIS module; then sending a second signal by using the RIS module and different second antenna units together based on the channel state information of the RIS module, channel state information of the different second antenna units, and different reflection coefficients of the RIS module, and obtaining a strength of the second signal received by a receiver, where the second antenna unit includes at least one antenna in any group of antennas; and finally determining, as the first antenna unit, a second antenna unit existing when the strength of the second signal is maximum.

In some embodiments, the transmitting target information by using the RIS module and the first antenna unit includes: determining, as a target reflection coefficient, a reflection coefficient of the RIS module existing when the strength of the second signal is maximum; adjusting a channel of the RIS module based on the target reflection coefficient of the RIS module; and transmitting the target information by using a channel of the first antenna unit and the adjusted channel of the RIS module.

According to the information transmission method provided in this embodiment of this application, when the terminal device works in the single-connection mode, the first antenna unit is determined based on the signal strength of the antenna, and the RIS module is used to assist the first antenna unit in uplink transmission, so that transmission performance of the terminal device in the single-connection mode is improved.

In some embodiments, the performing channel estimation on the RIS module to determine channel state information of the RIS module includes but is not limited to the following two manners:

Manner 1: When a distance between the RIS module and the first antenna unit is greater than a preset value, channel state information of some RIS units in the RIS module is estimated, where the RIS module includes a plurality of RIS units; and channel state information of a remaining RIS unit in the RIS module is predicated based on the channel state information of the some RIS units, where the remaining RIS unit is an RIS unit other than the RIS units in the RIS.

In an example, that channel state information of some RIS units in the RIS module is estimated includes: controlling, based on a preset estimation condition of the RIS unit, the some RIS units to be enabled, and estimating the channel state information of the enabled some RIS units, where the preset estimation condition includes at least one of a communication frequency band, a moving speed of a user, and a sampling rate of the RIS module for a control signal.

For example, that channel state information of a remaining RIS unit in the RIS module is predicated based on the channel state information of the some RIS units includes: predicting the channel state information of the remaining RIS unit based on the channel state information of the some RIS units by using a first prediction model, where the first prediction model is obtained by training based on history channel state information of the some RIS units and history channel state information of the remaining RIS unit.

In the manner 1, the channel state information of the some RIS units in the RIS module is estimated by using the conventional channel estimation method, and the channel state information of the remaining RIS unit is estimated by using the estimated channel state information of the some RIS units. Therefore, channel estimation workload can be reduced, and a channel estimation time can be reduced, so that transmission efficiency of a system is improved.

Manner 2: When a distance between the RIS module and the first antenna unit is less than or equal to a preset value, channel state information of a preset quantity of antennas in the at least two groups of antennas is obtained; and the channel state information of the RIS module is predicated based on the channel state information of the preset quantity of antennas.

For example, that the channel state information of the RIS module is predicated based on the channel state information of the preset quantity of antennas includes: predicting the channel state information of the RIS module based on the channel state information of the preset quantity of antennas by using a second prediction model, where the second prediction model is obtained by training based on history channel state information of the preset quantity of antennas and history channel state information of the RIS module.

In the manner 2, because a quantity of antennas is less than a quantity of RIS units in the RIS module, a speed of antenna channel estimation is higher. The channel state information of the RIS module is predicted by using the channel state information of the antenna. The prediction process is simple and fast, so that a pilot frequency and a measurement overhead of the RIS are reduced, a time used by the RIS module for data transmission is increased, and a throughput of uplink and downlink transmission is increased.

In a possible implementation, the terminal device further includes an RIS switch, and the transmitting target information by using the RIS module and the first antenna unit includes: enabling, by controlling the RIS switch, the RIS module to be connected to the first antenna unit; and transmitting the target information by using the RIS module and the first antenna unit that are connected.

In a possible implementation, the transmitting target information by using the RIS module and the first antenna unit further includes: radiating, by controlling the first antenna unit, a signal to point to the RIS module; and transmitting the target information by using the RIS module and the first antenna unit that are connected.

According to a second aspect, an embodiment of this application provides an information transmission apparatus. The information transmission apparatus may be a terminal device, or may be a component of a terminal device. The information transmission apparatus may include a processing unit.

The processing unit is configured to: determine a first antenna unit to be assisted, and transmit target information by using an RIS module and a first antenna unit. The first antenna unit includes at least one antenna in any group of antennas.

In a possible implementation, the processing unit is specifically configured to: when the terminal device works in a multi-connection mode, determine the first antenna unit based on a signal coverage situation of the terminal device.

In a possible implementation, the processing unit is specifically configured to: when the terminal device is in weak coverage, determine a working antenna that is farthest from the RIS module as the first antenna unit; or when the terminal device is shielded, determine a working antenna whose beam is shielded as the first antenna unit, where the shielding situation is that a beam of at least one working antenna of the terminal device is shielded; or when the terminal device is in non-weak coverage and is not shielded, determine an antenna with a highest service priority as the first antenna unit.

In a possible implementation, the processing unit is specifically configured to: perform channel estimation on the RIS module to determine channel state information of the RIS module; and transmit the target information based on the channel state information of the RIS module and channel state information of the first antenna unit.

In a possible implementation, the processing unit is specifically configured to: send a first signal by using the RIS module and the first antenna unit together based on the channel state information of the RIS module, the channel state information of the first antenna unit, and different reflection coefficients of the RIS module, and obtain a strength of the first signal received by a receiver; obtain a target reflection coefficient of the RIS module based on the strength of the first signal received by the receiver; adjust a channel of the RIS module based on the target reflection coefficient of the RIS module; and transmit the target information by using a channel of the first antenna unit and the adjusted channel of the RIS module. The strength of the signal received by the receiver is related to the reflection coefficients of the RIS module.

In a possible implementation, the processing unit is specifically configured to determine, as the target reflection coefficient, a reflection coefficient of the RIS module existing when the strength of the first signal is maximum.

In a possible implementation, the processing unit is specifically configured to: when the terminal device works in a single-connection mode, determine the first antenna unit based on signal strengths of antennas in the at least two groups of antennas.

In a possible implementation, the processing unit is specifically configured to: perform channel estimation on the RIS module to determine channel state information of the RIS module; send a second signal by using the RIS module and different second antenna units together based on the channel state information of the RIS module, channel state information of the different second antenna units, and different reflection coefficients of the RIS module, and obtain a strength of the second signal received by a receiver, where the second antenna unit includes at least one antenna in any group of antennas; and determine, as the first antenna unit, a second antenna unit existing when the strength of the second signal is maximum.

In a possible implementation, the processing unit is specifically configured to: determine, as a target reflection coefficient, a reflection coefficient of the RIS module existing when the strength of the second signal is maximum; adjust a channel of the RIS module based on the target reflection coefficient of the RIS module; and transmit the target information by using a channel of the first antenna unit and the adjusted channel of the RIS module.

In a possible implementation, the processing unit is specifically configured to: when a distance between the RIS module and the first antenna unit is greater than a preset value, estimate channel state information of some RIS units in the RIS module, where the RIS module includes a plurality of RIS units; and predict channel state information of a remaining RIS unit in the RIS module based on the channel state information of the some RIS units, where the remaining RIS unit is an RIS unit other than the RIS units in the RIS.

In a possible implementation, the processing unit is specifically configured to: control, based on a preset estimation condition of the RIS unit, the some RIS units to be enabled, and estimate the channel state information of the enabled some RIS units. The preset estimation condition includes at least one of a communication frequency band, a moving speed of a user, and a sampling rate of the RIS module for a control signal.

In a possible implementation, the processing unit is specifically configured to predict the channel state information of the remaining RIS unit based on the channel state information of the some RIS units by using a first prediction model. The first prediction model is obtained by training based on history channel state information of the some RIS units and history channel state information of the remaining RIS unit.

In a possible implementation, the processing unit is specifically configured to: when a distance between the RIS module and the first antenna unit is less than or equal to a preset value, obtain channel state information of a preset quantity of antennas in the at least two groups of antennas; and predict the channel state information of the RIS module based on the channel state information of the preset quantity of antennas.

In a possible implementation, the processing unit is specifically configured to predict the channel state information of the RIS module based on the channel state information of the preset quantity of antennas by using a second prediction model. The second prediction model is obtained by training based on history channel state information of the preset quantity of antennas and history channel state information of the RIS module.

In a possible implementation, the terminal device further includes an RIS switch, and the processing unit is specifically configured to: enable, by controlling the RIS switch, the RIS module to be connected to the first antenna unit; and transmit the target information by using the RIS module and the first antenna unit that are connected.

In a possible implementation, the terminal device further includes at least two front-end modules, each front-end module is connected to a group of antennas, and the processing unit is specifically configured to: be connected, by controlling an RIS switch, to a front-end module corresponding to the first antenna unit, so that the RIS module is connected to the first antenna unit; and transmit the target information by using the RIS module and the first antenna unit that are connected.

For beneficial effects of the information transmission apparatus provided in the second aspect, refer to the beneficial effects brought by the possible implementations of the first aspect. Details are not described herein again.

According to a third aspect, an embodiment of this application provides an information transmission apparatus. The information transmission apparatus may be a terminal device, or may be a component (for example, an integrated circuit or a chip) of a terminal device. The information transmission apparatus may implement functions corresponding to the steps in the method in the first aspect. The functions may be implemented by hardware, or may be implemented by hardware executing corresponding software. The hardware or the software includes one or more units or modules corresponding to the foregoing functions.

In a possible design, the apparatus includes a processor. The processor is configured to support the apparatus in executing the corresponding functions in the method in the foregoing first aspect. The apparatus may further include a memory. The memory is configured to be coupled to the processor, and the memory stores program instructions and data that are necessary for the apparatus. Optionally, the apparatus further includes a transceiver. The transceiver is configured to support communication between the apparatus and another network element. The transceiver may be an independent receiver, an independent transmitter, or a transceiver integrating a sending function and a receiving function.

According to a fourth aspect, an embodiment of this application provides a terminal device, including an RIS module, a processor, and at least two groups of antennas. A radio standard corresponding to each group of antennas is different from or the same as each other, and each group of antennas includes at least one antenna.

The at least two groups of antennas are configured to receive and send information.

The RIS module is configured to assist a first antenna unit in receiving and sending information.

The processor is configured to perform the method according to any one of the first aspect or the possible designs of the first aspect.

In a possible design, the terminal device further includes an RIS switch.

The processor is specifically configured to: enable, by controlling the RIS switch, the RIS module to be connected to the first antenna unit; and transmit target information by using the RIS module and the first antenna unit that are connected.

Optionally, the processor is a modem processor of the terminal device.

According to a fifth aspect, an embodiment of this application provides an information transmission apparatus. The apparatus exists in a product form of a chip, a structure of the apparatus includes a processor and a memory, and the memory is configured to be coupled to the processor to store program instructions and data that are necessary for the apparatus. The processor is configured to execute the program instructions stored in the memory, so that the apparatus performs functions of the terminal device in the foregoing method.

According to a sixth aspect, an embodiment of this application provides a computer storage medium. The storage medium includes computer instructions, and when the instructions are executed by a computer, the computer is enabled to implement the information transmission method according to any one of the first aspect or the possible designs of the first aspect.

According to a seventh aspect, an embodiment of this application provides a computer program product. The program product includes a computer program, the computer program is stored in a readable storage medium, at least one processor of a communications device may read the computer program from the readable storage medium, and the at least one processor executes the computer program, so that the communications device implements the information transmission method according to any one of the first aspect or the possible designs of the first aspect.

According to the information transmission method and apparatus and the terminal device provided in embodiments of this application, the RIS module is disposed in the terminal device. In an information transmission process, the terminal device determines the first antenna unit to be assisted, and uses the RIS module to assist the first antenna unit in transmitting the target information. Because the RIS module generates an additional transmit beam or receive beam, uplink or downlink signal quality of the terminal device is improved, so that uplink and downlink transmission performance of the terminal device is improved.

DESCRIPTION OF EMBODIMENTS

The following describes the technical solutions in embodiments of this application with reference to the accompanying drawings in embodiments of this application.

It should be understood that in embodiments of this application, "B corresponding to A" indicates that B is associated with A. In an implementation, B may be determined based on A. However, it should be further understood that determining B based on A does not mean that B is determined based only on A. B may alternatively be determined based on A and/or other information. The term "a plurality of" in this specification means two or more than two. The term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects. In the formula, the character "/" indicates a "division" relationship between the associated objects.

In the specification, claims, and accompanying drawings of the present invention, the terms such as "first" and "second" distinguish between same items or similar items whose functions and effects are basically the same. A person skilled in the art may understand that the words such as "first" and "second" limit neither of a quantity and an execution sequence, and the words such as "first" and "second" do not indicate a definite difference either.

Figure 1:
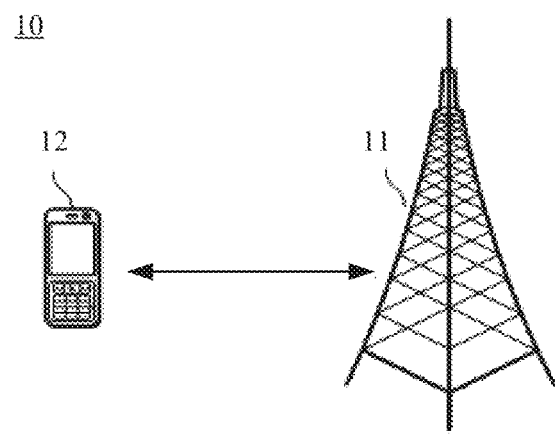
FIG. 1 shows a communications system applicable to this application.

FIG. 1 shows a communications system applicable to this application. The communications system 10 is in a single carrier scenario or a carrier aggregation (carrier aggregation, CA) scenario. The communications system 10 includes a network device 11 and a terminal device 12. The network device 110 communicates with the terminal device 120 through a wireless network.

It should be understood that, the network device 11 in FIG. 1 may include one or more cells.

When a transmission direction of the communications system 10 is uplink transmission, the terminal device 12 is a transmit end, and the network device 11 is a receive end. When the transmission direction of the communications system 10 is downlink transmission, the network device 11 is a transmit end, and the terminal device 12 is a receive end.

Figure 2:
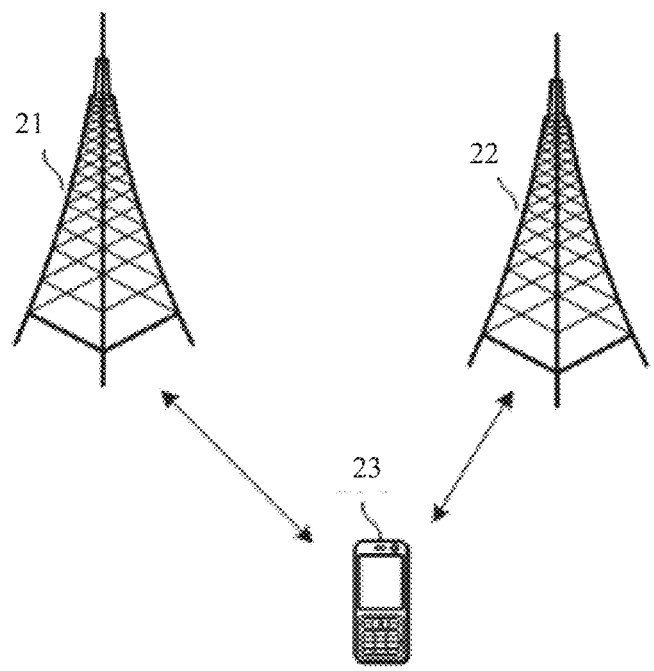
FIG. 2 shows another communications system applicable to this application.

FIG. 2 shows another communications system applicable to this application. The communications system 200 is in a dual connectivity (dual connectivity, DC) or coordinated multipoint transmission/reception (coordinated multipoint transmission/reception, CoMP) scenario. The communications system 20 includes a network device 21, a network device 22, and a terminal device 23. The network device 21 is a network device initially accessed by the terminal device 23, and is responsible for RRC communication with the terminal device 23. The network device 22 is added during RRC reconfiguration, and is configured to provide an additional radio resource. The terminal device 23 for which carrier aggregation (CA) is configured is connected to the network device 21 and the network device 22. A link between the network device 21 and the terminal device 23 may be referred to as a first link, and a link between the network device 22 and the terminal device 23 may be referred to as a second link.

The communications system applicable to this application is merely an example for description, and the communications system applicable to this application is not limited thereto. For example, other quantities of network devices and terminal devices may alternatively be included in the communications system, or a single base station and multi-carrier aggregation scenario, a dual connectivity scenario, or a device-to-device (device to device, D2D) communication scenario may be used.

It should be understood that the technical solutions in embodiments of this application may be applied to beam indication in a single carrier or carrier aggregation (carrier aggregation, CA) scenario, or beam indication in a dual connectivity (dual connectivity, DC) scenario.

It should be understood that the technical solutions in embodiments of this application may be applicable to a case in which a primary cell (Pcell) uses a high frequency or a low frequency, and a secondary cell (Scell) uses a high frequency or a low frequency. For example, when the Pcell uses a low frequency, the Scell uses a high frequency. Usually, the low frequency and the high frequency are relative to each other, or may be differentiated based on a specific frequency, for example, 6 GHz.

It should be understood that the technical solutions in embodiments of this application may be further applied to beam indication in a coordinated multipoint transmission/reception (coordinated multipoint transmission/reception, CoMP) scenario. CoMP may be one or more of a non-coherent joint transmission (non-coherent joint transmission, NCJT) scenario, a coherent joint transmission (coherent joint transmission, CJT) scenario, a joint transmission (joint transmission, JT) scenario, or the like.

The terminal device in embodiments of this application may be user equipment, an access terminal, a subscriber unit, a subscriber station, a mobile station, a remote station, a remote terminal, a mobile device, a user terminal, a terminal, a wireless communications device, a user agent, or a user apparatus. The terminal device may alternatively be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, a terminal device in a future 5G network, a terminal device in a future evolved public land mobile network (public land mobile network, PLMN), or the like. This is not limited in embodiments of this application.

As an example instead of a limitation, in embodiments of this application, the terminal device may alternatively be a wearable device. The wearable device may also be referred to as a wearable intelligent device, and is a general term of a wearable device that is intelligently designed and developed for daily wear by using a wearable technology, for example, glasses, gloves, a watch, clothing, and shoes. The wearable device is a portable device that can be directly worn by a user or integrated into clothes or an accessory of a user. The wearable device is not only a hardware device, but also implements a powerful function through software support, data exchange, and cloud interaction. Generalized wearable intelligent devices include full-featured and large-size devices that can implement complete or partial functions without depending on smartphones, such as smart watches or smart glasses, and devices that focus on only one type of application and need to work with other devices such as smartphones, such as various smart bands or smart jewelry for monitoring physical signs.

In addition, in embodiments of this application, the terminal device may alternatively be a terminal device in an internet of things (internet of things, IoT) system. IoT is an important part of future information technology development. A main technical feature of the IoT is connecting things to networks by using communications technologies, to implement an intelligent network for interconnection between persons and machines, and between things. In embodiments of this application, the IoT technology can implement massive connections, in-depth coverage, and terminal power saving by using, for example, a narrow band (narrow band) NB technology.

In addition, in embodiments of this application, the terminal device may further include a sensor such as an intelligent printer, a train detector, or a gas station. Main functions of the terminal device include collecting data (for some terminal devices), receiving control information and downlink data from a network device, sending an electromagnetic wave, and transmitting uplink data to the network device.

A network device in embodiments of this application may be a device configured to communicate with the terminal device. The network device may be a base transceiver station (base transceiver station, BTS) in a global system for mobile communications (global system for mobile communications, GSM) or code division multiple access (code division multiple access, CDMA), or may be a NodeB (NodeB, NB) in a wideband code division multiple access (wideband code division multiple access, WCDMA) system, or may be an evolved NodeB (evolved NodeB, eNB or eNodeB) in an LTE system, or may be a radio controller in a cloud radio access network (cloud radio access network, CRAN) scenario. Alternatively, the network device may be a relay station. an access point, a vehicle-mounted device, a wearable device, a network device in a future 5G network, a network device in a future evolved PLMN network, or the like. This is not limited in embodiments of this application.

The network device in embodiments of this application may be a device in a wireless network, for example, a radio access network (radio access network, RAN) node that connects a terminal to the wireless network. Currently, the RAN node is, for example, a base station, a next generation NodeB gNB, a transmission reception point (transmission reception point, TRP), an evolved NodeB (evolved NodeB, eNB), a home base station, a baseband unit (baseband unit, BBU), or an access point (access point, AP) in a Wi-Fi system. In a network structure, the network device may include a centralized unit (centralized unit, CU) node, or a distributed unit (distributed unit, DU) node, or a RAN device including a CU node and a DU node.

The communications system shown in FIG. 1 or FIG. 2 may be a 2G, 3G, 4G, or 5G communications system or a next generation (next generation) communications system, a global system for mobile communications (global system for mobile communications. GSM), or a code division multiple access (code division multiple, CDMA) system, a wideband code division multiple access (wideband code division multiple access, WCDMA) system, a general packet radio service (general packet radio service, GPRS), a long term evolution (long term evolution, LTE) system, an LTE frequency division duplex (division frequency duplex, FDD) system, LTE time division duplex (time division duplex, TDD), a universal mobile telecommunications system (universal mobile telecommunications system, UMTS), a worldwide interoperability for microwave access (worldwide interoperability for microwave access, WiMAX) communications system, a future fifth generation (5th generation, 5G) mobile communications system, new radio (new radio, NR), or the like. The 5G mobile communications system in this application includes a non-standalone (non-standalone, NSA) 5G mobile communications system and/or standalone (standalone, SA) 5G mobile communications system. The technical solutions provided in this application may further be applied to a future communications system, for example, a sixth generation mobile communications system. The communications system may be a PLMN network, a device-to-device (device-to-device, D2D) network, a machine-to-machine (machine-to-machine, M2M) network, an IoT network, or another network.

In embodiments of this application, the network device and the terminal device may communicate with each other by using a licensed spectrum (licensed spectrum), may communicate with each other by using an unlicensed spectrum (unlicensed spectrum), or may communicate with each other by using both a licensed spectrum and an unlicensed spectrum. The network device and the terminal device may communicate with each other by using a spectrum below 6 GHz, may communicate with each other by using a spectrum above 6 GHz, or may communicate with each other by using both a spectrum below 6 GHz and a spectrum above 6 GHz. A spectrum resource used between the network device and the terminal device is not limited in embodiments of this application.

Embodiments of this application may be applicable to downlink data transmission, or may be applicable to uplink data transmission. For the downlink data transmission, a sending device is a network device, and a corresponding receiving device is a terminal device. For the uplink data transmission, a sending device is a terminal device, and a corresponding receiving device is a network device.

For ease of understanding embodiments of this application, related concepts in embodiments of this application are first briefly described as follows.

Resources described in embodiments of this application are transmission resources, including a time domain resource and a frequency domain resource; and may be used to carry data or signaling in an uplink communication process or a downlink communication process.

In embodiments of this application, unless otherwise specified, "transmission" (transmit/transmission) refers to bidirectional transmission, and includes a sending action and/or a receiving action. Specifically, "transmission" in embodiments of this application includes data sending, data receiving, or data sending and data receiving. In other words, the data transmission herein includes uplink and/or downlink data transmission. Data may include a channel and/or a signal. The uplink data transmission is uplink channel and/or uplink signal transmission, and the downlink data transmission is downlink data channel and/or downlink signal transmission.

A reconfigurable intelligent surface (reconfigurable intelligent meta-surface, RIS) is a digital reconfigurable artificial electromagnetic surface, which includes a large quantity of sub-wavelength digital reconfigurable artificial units arranged in a specific macroscopic manner (periodic or aperiodic). Because basic units and arrangement manners of the reconfigurable intelligent surface can be designed randomly, a limitation that it is difficult to accurately control a conventional material at an atomic level or a molecular level can be broken through, and an unconventional medium parameter that cannot be implemented by the conventional material and a conventional technology can be constructed, to efficiently and flexibly control an electromagnetic wave. A feature of an electromagnetic field in a specific spatial location can be controlled by changing status distribution of the basic unit.

Figure 3:
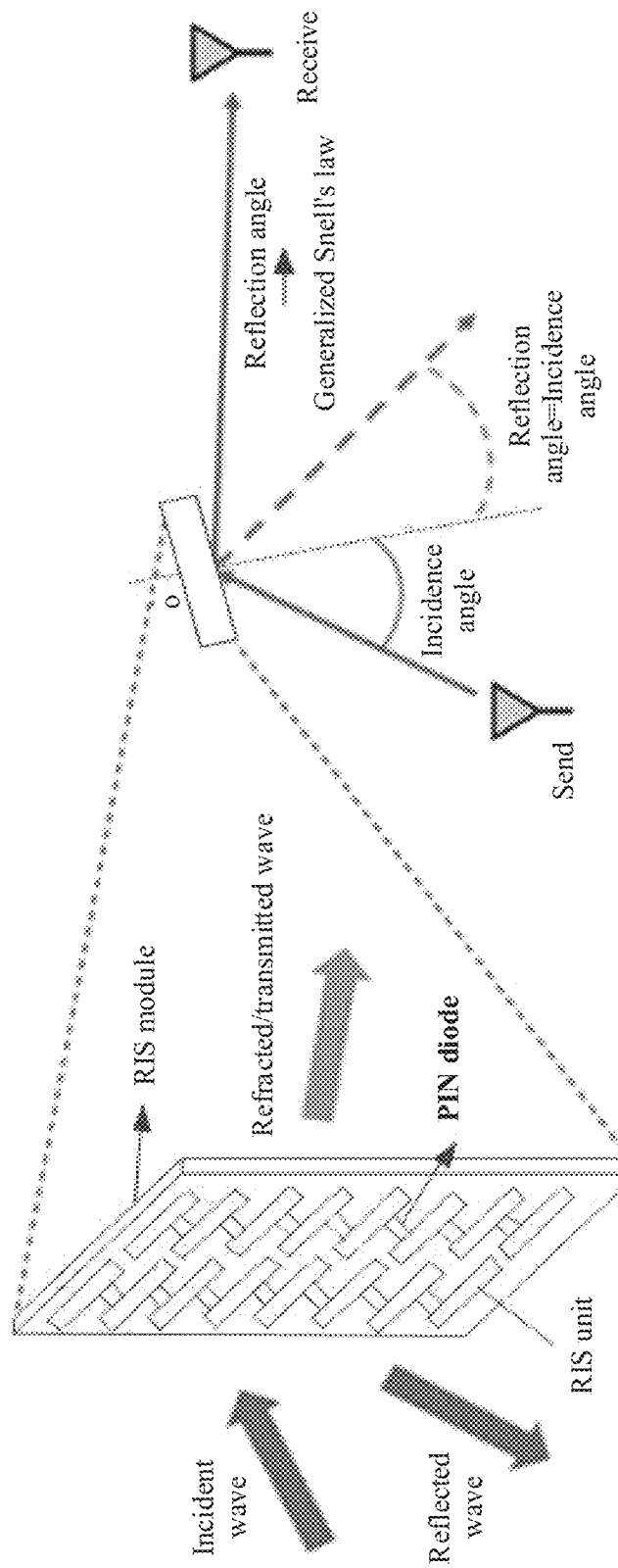
FIG. 3 is a schematic diagram of a working principle of an RIS module.

FIG. 3 is a schematic diagram of a working principle of an RIS module. As shown in FIG. 3, the RIS module includes a plurality of RIS units, and an incident signal may be independently reflected by controlling an amplitude and/or a phase of each RIS unit, so that fine three-dimensional (3D) passive beamforming for directional signal enhancement or null forming is implemented collaboratively. Compared with a conventional surface, an RIS module has an ability to shape a radio wave based on a generalized Snell's law, for example, enable a reflection angle of the radio wave to not be equal to an incidence angle. A reconfigurable intelligent surface may be implemented by controlling parameters such as the reflection angle or the incidence angle of the RIS module to the radio wave. Control modes include a PIN diode, a variable capacitance diode, and the like. For example, different bias voltages are applied to the PIN diodes, so that the RIS units are in different states, for example, an on or off state, thereby generating different parameter configurations, for example, a difference of 180° between reflected phases of radio waves.

Because of features such as low costs, easy integration, low power consumption and flexible control, the RIS module has a wide application prospect in fields such as communication, radar, and stealth. In the communication field, an RIS module is usually used in a wireless network. A scattering feature of the RIS module is used to reflect a radio signal, to improve coverage and a capacity of the wireless network. A radiation feature of the RIS module is used to directly modulate and send data, so that a radio frequency front-end module such as a frequency mixer and an amplifier in a conventional communications link is omitted, to reduce power consumption and costs.

An existing terminal device is usually a multi-standard terminal device, for example, includes a plurality of radio standards such as 2G, 3G, 4G, and 5G. As the radio standards increase, a used frequency is increasingly high, for example, sub-6 GHz and a millimeter wave frequency band of 5G NR. A high frequency band may bring a higher transmission rate because there is more bandwidth, but attenuation of radio signal transmission is also greater. As a result, uplink and downlink transmission performance of the terminal device is poor.

To resolve the foregoing technical problem, in embodiments of this application, an RIS module is added to the terminal device. The RIS module is used to assist a first antenna unit in transmitting target information, so that uplink transmission performance of the terminal device is enhanced.

Some embodiments are used below to describe in detail the technical solutions in embodiments of this application. The following several embodiments may be combined with each other, and a same or similar concept or process may not be described repeatedly in some embodiments.

Figure 4:
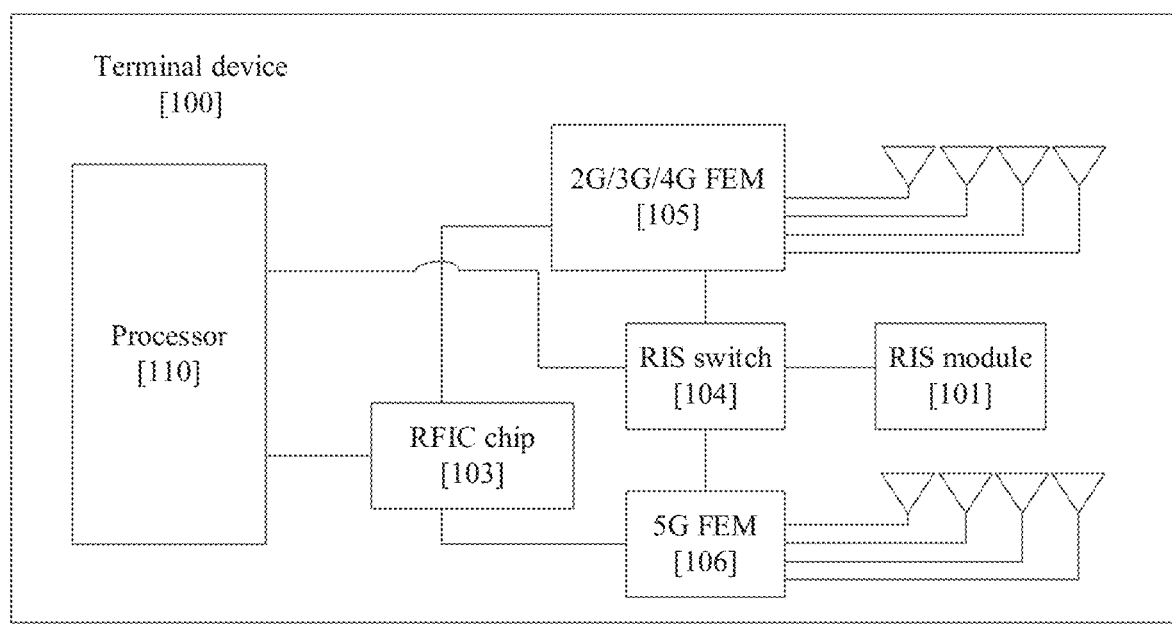
FIG. 4 is a schematic diagram of a structure of a terminal device according to an embodiment of this application.

FIG. 4 is a schematic diagram of a structure of a terminal device according to an embodiment of this application. As shown in FIG. 4, the terminal device 100 in this embodiment of this application includes a processor 110, an RIS module 101, and at least two groups of antennas. A radio standard corresponding to each group of antennas is different from or the same as each other. For example, as shown in FIG. 4, one group of antennas is a 2G/3G/4G antenna group, and the other group of antennas is a 5G antenna group. Each group of antennas includes at least one antenna. For example, as shown in FIG. 3, the 2G/3G14G antenna group includes four antennas, and the 5G antenna group also includes four antennas. It should be noted that different groups of antennas may include a same quantity or different quantities of antennas. This is not limited in this embodiment of this application.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a display processing unit (display processing unit, DPU), a neural network processing unit (neural network processing unit, NPU), and/or the like. Different processing units may be independent components, or may be integrated into one or more processors. In some embodiments, the terminal device 100 may alternatively include one or more processors 110. The controller may be a nerve center and a command center of the terminal device 100. The controller may generate an operation control signal based on instruction operation code and a time sequence signal, to control instruction fetching and instruction execution. A memory may further be disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access and reduces a waiting time of the processor 110, thereby improving system efficiency of the terminal device 100.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like. The USB interface 130 is an interface that conforms to USB standard specifications, and may be specifically a mini USB interface, a micro USB interface, a USB Type-C interface, or the like. The USB interface 130 may be configured to connect to a charger to charge the terminal device 100, or may be configured to perform data transmission between the terminal device 100 and a peripheral device, or may be configured to connect to a headset to play audio by using the headset.

It may be understood that an interface connection relationship between the modules in this embodiment of this application is merely an example for description, and does not constitute a limitation on the structure of the terminal device 100. In some other embodiments of this application, the terminal device 100 may alternatively use an interface connection manner different from that in the foregoing embodiment, or may use a combination of a plurality of interface connection manners.

In some embodiments, as shown in FIG. 4, the terminal device further includes a radio frequency integrated circuit (radio frequency integrated circuit, RFIC) chip 103, two front end module (front end module, FEM) chips, and one RIS switch 104. The two FEM chips are a 2G/3G/4G FEM 105 and a 5G FEM 106.

Optionally, the processor in this embodiment of this application may be a modem processor.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to a speaker, a receiver, or the like), or displays an image or a video by using a display. In some embodiments, the modem processor may be an independent component. In some other embodiments, the modem processor may be independent of the processor 110, and is disposed in a same device as a mobile communications module or another function module.

The RFIC chip 103 is configured to convert a to-be-transmitted baseband signal into a radio frequency signal, or convert a received radio frequency signal into a baseband signal.

The FEM is configured to complete transmit amplification and receive amplification of a radio frequency signal, to improve transmission efficiency of an antenna.

The RIS switch 104 is configured to: under control of the processor 110, enable the RIS module 101 to be connected to a first antenna unit to be assisted. For example, when the first antenna unit to be assisted is at least one antenna in the 2G/3G/4G antenna group, the RIS switch 104 switches, under control of the processor 110, to a channel corresponding to the 2G/3G/4G antenna group, so that the first antenna unit is connected to the RIS module 101; and when the first antenna unit to be assisted is at least one antenna m the 5G antenna group, the RIS switch 104 switches, under control of the processor 110, to a channel corresponding to the 5G antenna group, so that the first antenna unit is connected to the RIS module.

Figure 5:
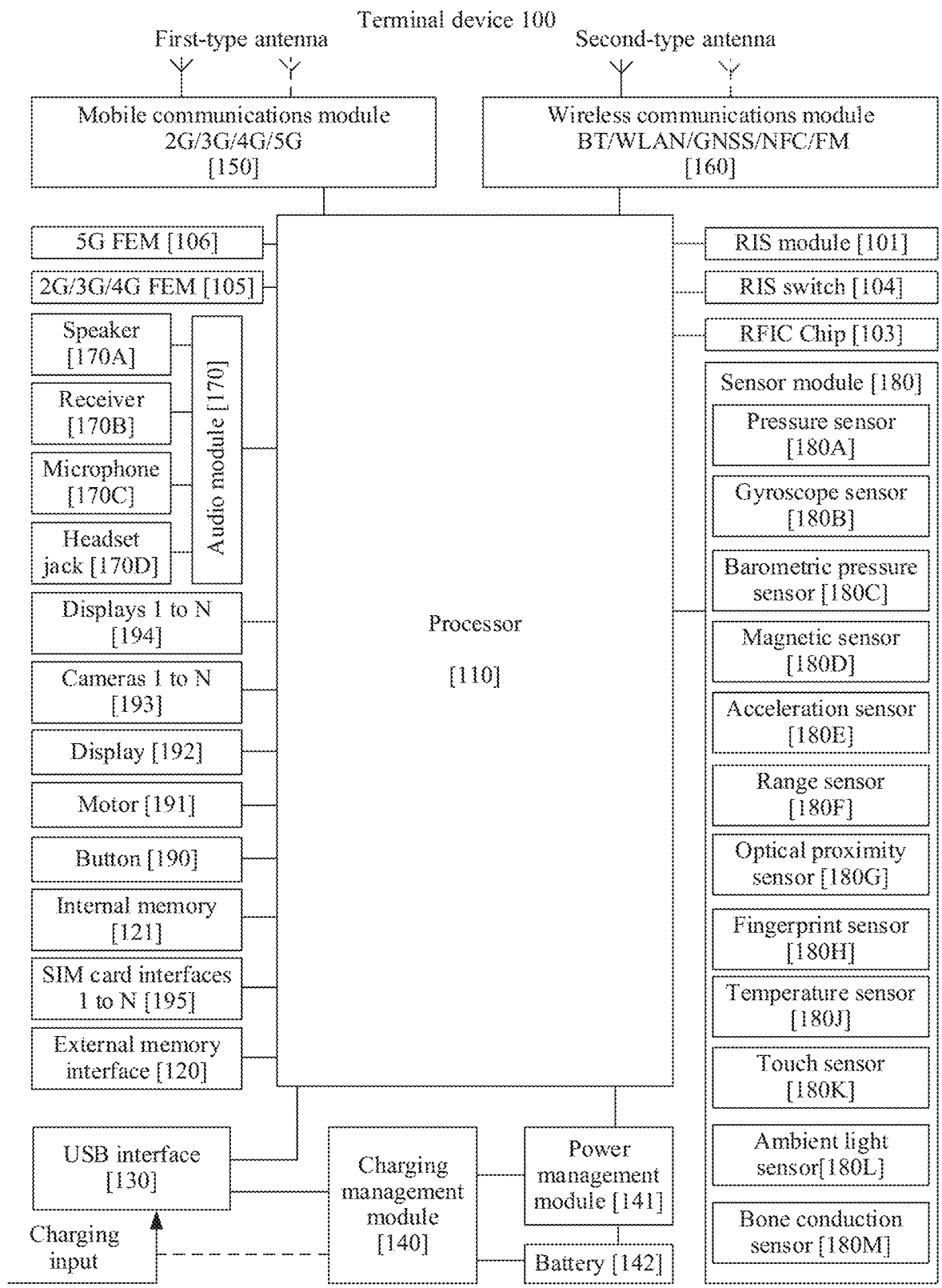
FIG. 5 is a schematic diagram of another structure of a terminal device according to an embodiment of this application.

FIG. 5 is a schematic diagram of another structure of the terminal device according to this embodiment of this application. As shown in FIG. 5, in some embodiments, the terminal device 100 may further include an external memory interface 120, an internal memory 121, and the universal serial bus (universal serial bus, USB) interface 130, a charging management module 140, a power management module 141, a battery 142, a second-type antenna, a mobile communications module 150, a wireless communications module 160, an audio module 170, a speaker 170A, a receiver 170B, a microphone 170C, a headset jack 170D, a sensor 180, a button 190, a motor 191, an indicator 192, a camera 193, a display 194, a subscriber identity module (subscriber identity module, SIM) card interface 195, and the like. It can be understood that the structure shown in this embodiment does not constitute a specific limitation on the terminal device 100. In some other embodiments of this application, the terminal device 100 may include more or fewer components than those shown in the figure, or combine some components, or split some components, or have different component arrangements. The components shown in the figure may be implemented by hardware, software, or a combination of software and hardware.

The charging management module 140 is configured to receive a charging input from the charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input through a wireless charging coil of the terminal device 100. The charging management module 140 may further supply power to the terminal device 100 by using the power management module 141 while charging the battery 142.

The power management module 141 is configured to connect the battery 142 and the charging management module 140 to the processor 110. The power management module 141 receives an input of the battery 142 and/or the charging management module 140, and supplies power to the processor 110, the internal memory 121, the display 194, the camera 193, the wireless communications module 160, and the like. The power management module 141 may further be configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the terminal device 100 may be implemented by using a first-type antenna (that is, an RIS module and at least two groups of antennas), the second-type antenna, the mobile communications module 150, the wireless communications module 160, the modem processor, the baseband processor, and the like. The first-type antenna and the second-type antenna are configured to transmit and receive electromagnetic wave signals. Each antenna in the terminal device 100 may be configured to cover one or more communications frequency bands. Different antennas may be further multiplexed, to improve antenna utilization. For example, the first-type antenna may be multiplexed as a diversity antenna of a wireless local area network. In some other embodiments, the antenna may be used in combination with a tuning switch.

The mobile communications module 150 can provide a solution, applied to the terminal device 100, to wireless communication including 2G, 3G, 4G, 5G, and the like. The mobile communications module 150 may include at least one filter, a switch, a power amplifier, a low noise amplifier, and the like. The mobile communications module 150 may receive an electromagnetic wave through the first-type antenna, perform processing such as filtering or amplification on the received electromagnetic wave, and transmit a processed electromagnetic wave to the modem processor for demodulation. The mobile communications module 150 may further amplify a signal modulated by the modem processor, and convert an amplified signal into an electromagnetic wave for radiation through the first-type antenna. In some embodiments, at least some function modules in the mobile communications module 150 may be disposed in the processor 110. In some embodiments, at least some function modules in the mobile communications module 150 may be disposed in a same device as at least some modules in the processor 110.

The wireless communications module 160 may provide a solution, applied to the terminal device 100, to wireless communication including a wireless local area network (wireless local area network, WLAN), Bluetooth, a global navigation satellite system (global navigation satellite system, GNSS), frequency modulation (frequency modulation, FM), NFC, an infrared (infrared, IR) technology, and the like. The wireless communications module 160 may be one or more components integrating at least one communications processing module. The wireless communications module 160 receives an electromagnetic wave through the second-type antenna, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the second-type antenna.

In some embodiments, in the terminal device 100, the first-type antenna and the mobile communications module 150 are coupled, and the second-type antenna and the wireless communications module 160 are coupled, so that the terminal device 100 can communicate with a network and another device by using a wireless communications technology. The wireless communications technology may include a GSM, a GPRS, CDMA, WCDMA, TD-SCDMA, LTE, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system. BDS), a quasi-zenith satellite system (quasi-zenith satellite system, QZSS), and/or a satellite based augmentation system (satellite based augmentation system, SBAS).

The terminal device 100 implements a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs that execute instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the terminal device 100 may include one or N displays 194, where N is a positive integer greater than 1.

The terminal device 100 may implement a photographing function by using the ISP, one or more cameras 193, the video codec, the GPU, one or more displays 194, the application processor, and the like.

The NPU is a neural network (neural network, NN) computing processor, quickly processes input information by referring to a structure of a biological neural network, for example, by referring to a mode of transmission between human brain neurons, and may further continuously perform self-learning. The NPU can implement applications such as intelligent cognition of the terminal device 100, such as image recognition, facial recognition, speech recognition, and text understanding.

The DPU is also referred to as a display subsystem (Display Sub-System, DSS). The DPU is configured to adjust a color of the display 194, and the DPU may adjust the color of the display by using a three-dimensional lookup table (3D look up table, 3D LLUT). The DPU can also perform scaling, noise reduction, contrast enhancement, backlight brightness management, HDR processing, and display parameter Gamma adjustment on an image.

The external memory interface 120 may be configured to connect to an external memory card, for example, a micro SD card, to extend a storage capability of the terminal device 100. The external memory card communicates with the processor 110 through the external memory interface 120, to implement a data storage function. For example, data files such as music, a photo, and a video are stored in the external memory card.

The internal memory 121 may be configured to store one or more computer programs, and the one or more computer programs include instructions. The processor 110 runs the instructions stored in the internal memory 121, to perform various function applications of the terminal device 100 and data processing. The internal memory 121 may include a program storage area and a data storage area. The program storage area may store an operating system. The program storage area may further store one or more applications (for example, Gallery and Contacts), and the like. The data storage area may store data (for example, a photo and a contact) and the like created when the terminal device 100 is used. In addition, the internal memory 121 may include a high-speed random access memory, or may include a non-volatile memory such as at least one disk storage device, a flash memory, or a universal flash storage (universal flash storage, UFS). In some embodiments, the processor 110 runs instructions stored in the internal memory 121 and/or instructions stored in the memory disposed in the processor 110, to enable the terminal device 100 to perform various function applications and data processing.

The terminal device 100 may implement an audio function such as music playing or recording by using the audio module 170, the speaker 170A, the receiver 170B, the microphone 170C, the headset jack 170D, the application processor, and the like. The audio module 170 is configured to convert digital audio information into an analog audio signal for output, and is also configured to convert an analog audio input into a digital audio signal. The audio module 170 may further be configured to code and decode an audio signal. In some embodiments, the audio module 170 may be disposed in the processor 110, or some function modules in the audio module 170 are disposed in the processor 110. The speaker 170A, also referred to as a "horn", is configured to convert an audio electrical signal into a sound signal. The terminal device 100 may listen to music or answer a call in a hands-free mode by using the speaker 170A. The receiver 170B, also referred to as an "earpiece", is configured to convert an audio electrical signal into a sound signal. When a call is answered or voice information is received by using the terminal device 100, the receiver 170B may be put close to a human ear to listen to a voice. The microphone 170C, also referred to as a "mike" or a "microphone", is configured to convert a sound signal into an electrical signal. When making a call or sending voice information, a user may make a sound near the microphone 170C through the mouth of the user, to enter a sound signal to the microphone 170C. At least one microphone 170C may be disposed in the terminal device 100. In some other embodiments, two microphones 170C may be disposed in the terminal device 100, to collect a sound signal and implement a noise reduction function. In some other embodiments, three, four, or more microphones 170C may alternatively be disposed in the terminal device 100, to collect a sound signal, implement noise reduction, identify a sound source, implement a directional recording function, and the like. The headset jack 170D is configured to connect to a wired headset. The headset jack 170D may be the USB interface 130, or may be a 3.5 mm open mobile terminal platform (open mobile terminal platform, OMTP) standard interface or cellular telecommunications industry association of the USA (cellular telecommunications industry association of the USA. CTIA) standard interface.

The sensor 180 may include a pressure sensor 180A, a gyroscope sensor 180B, a barometric pressure sensor 180C, a magnetic sensor 180D, an acceleration sensor 180E, a range sensor 180F, an optical proximity sensor 180G, a fingerprint sensor 180H, a temperature sensor 180J, a touch sensor 180K, an ambient light sensor 180L, a bone conduction sensor 180M, and the like.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When force is applied to the pressure sensor 180A, capacitance between electrodes changes. The terminal device 100 determines a pressure strength based on the change of the capacitance. When a touch operation is performed on the display 194, the terminal device 100 detects a strength of the touch operation by using the pressure sensor 180A. The terminal device 100 may also calculate a touch location based on a detection signal of the pressure sensor 180A. In some embodiments, touch operations that are performed at a same touch location but have different touch operation strengths may correspond to different operation instructions. For example, when a touch operation whose touch operation strength is less than a first pressure threshold is performed on an icon of Messages, an instruction for viewing an SMS message is performed. When a touch operation whose touch operation strength is greater than or equal to the first pressure threshold is performed on the icon of Messages, an instruction for creating a new SMS message is performed.

The gyroscope sensor 180B may be configured to determine a motion posture of the terminal device 100. In some embodiments, angular velocities of the terminal device 100 around three axes (namely, x, y, and z axes) may be determined by using the gyroscope sensor 180B. The gyroscope sensor 180B may be configured to implement image stabilization during photographing. For example, when a shutter is pressed, the gyroscope sensor 180B detects an angle at which the terminal device 100 jitters, calculates, based on the angle, a distance for which a lens module needs to compensate, and allows the lens to cancel the jitter of the terminal device 100 through reverse motion, to implement image stabilization. The gyroscope sensor 180B may also be used in a navigation scenario, a motion-controlled gaming scenario, and the like.

The acceleration sensor 180E may detect magnitudes of accelerations in various directions (usually on three axes) of the terminal device 100, and may detect a magnitude and a direction of gravity when the terminal device 100 is still. The acceleration sensor 180E may further be configured to identify a posture of the terminal device, and is applied to an application such as switching between a landscape mode and a portrait mode or a pedometer.

The range sensor 180F is configured to measure a distance. The terminal device 100 may measure a distance in an infrared manner or a laser manner. In some embodiments, in a photographing scenario, the terminal device 100 may measure a distance by using the range sensor 180F, to implement quick focusing.

The optical proximity sensor 180G may include, for example, a light-emitting diode (LED) and an optical detector, for example, a photodiode. The light emitting diode may be an infrared light emitting diode. The terminal device 100 emits infrared light outward by using the light-emitting diode. The terminal device 100 detects infrared reflected light from a nearby object by using the photodiode. When sufficient reflected light is detected, the terminal device 100 may determine that there is an object near the terminal device 100. When insufficient reflected light is detected, the terminal device 100 may determine that there is no object near the terminal device 100. The terminal device 100 may detect, by using the optical proximity sensor 180G, that the user holds the terminal device 100 close to an ear to make a call, to automatically perform screen-off for power saving. The optical proximity sensor 180G may also be used in a smart cover mode or a pocket mode to automatically perform screen unlocking or locking.

The ambient light sensor 180L is configured to sense ambient light brightness. The terminal device 100 may adaptively adjust brightness of the display 194 based on the sensed ambient light brightness. The ambient light sensor 180L may also be configured to automatically adjust white balance during photographing. The ambient light sensor 180L may further cooperate with the optical proximity sensor 180G to detect whether the terminal device 100 is in a pocket, to avoid an accidental touch.

The fingerprint sensor 180H (also referred to as a fingerprint recognizer) is configured to collect a fingerprint. The terminal device 100 may use a feature of the collected fingerprint to implement fingerprint-based unlocking, application lock access, fingerprint-based photographing, fingerprint-based call answering, and the like. In addition, for other records about the fingerprint sensor, refer to the international patent application PCT/CN2017/082773 entitled "NOTIFICATION PROCESSING METHOD AND TERMINAL DEVICE", which is incorporated herein by reference in its entirety.

The touch sensor 180K may also be referred to as a touch panel or a touch-sensitive surface. The touch sensor 180K may be disposed on the display 194, and the touch sensor 180K and the display 194 constitute a touchscreen, which is also referred to as a "touchscreen". The touch sensor 180K is configured to detect a touch operation performed on or near the touch sensor 180K. The touch sensor may transfer the detected touch operation to the application processor to determine a type of the touch event. The display 194 may provide a visual output related to the touch operation. In some other embodiments, the touch sensor 180K may alternatively be disposed on a surface of the terminal device 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, to receive a blood pressure beating signal. In some embodiments, the bone conduction sensor 180M may alternatively be disposed in the headset, to obtain a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The terminal device 100 may receive a key input, and generate a key signal input related to a user setting and function control of the terminal device 100.

The SIM card interface 195 is configured to connect to a SIM card. The SIM card may be inserted into the SIM card interface 195 or detached from the SIM card interface 195, to implement contact with or separation from the terminal device 100. The terminal device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or different types. The SIM card interface 195 is compatible with different types of SIM cards. The SIM card interface 195 is also compatible with an external memory card. The terminal device 100 interacts with a network through the SIM card, to implement functions such as calling and data communication. In some embodiments, the terminal device 100 uses an eSIM, namely, an embedded SIM card. The eSIM card may be embedded into the terminal device 100, and cannot be separated from the terminal device 100.

Based on the schematic diagram of the structure of the terminal device shown in FIG. 4 or FIG. 5, the following describes in detail an information transmission method provided in embodiments of this application with reference to specific examples.

Figure 6:
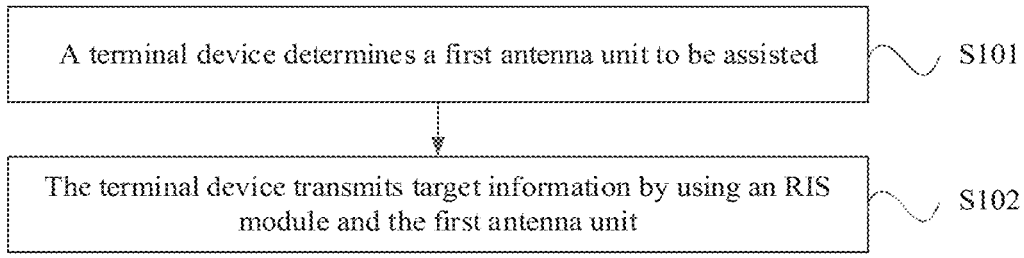
FIG. 6 is a schematic flowchart of an information transmission method according to an embodiment of this application.

FIG. 6 is a schematic flowchart of an information transmission method according to an embodiment of this application. As shown in FIG. 6, the method in this embodiment of this application includes the following steps.

S101: The terminal device determines the first antenna unit to be assisted.

As shown in FIG. 4, the terminal device includes at least two groups of antennas. One group of antennas is connected to the 2G/3G/4G FEM, and is configured to receive or send a signal of a 2G/3G/4G network. For ease of understanding, the group of antennas may be denoted as a 2G/3G/4G antenna. The 2G/3G/4G antenna includes at least one antenna. For example, as shown in FIG. 4, the 2G/3G/4G antenna includes four antennas. In actual application, one of the four antennas may be selected to receive and send a signal of the 2G/3G/4G network, or more (for example, four) of the four antennas may be selected to receive and send a signal of the 2G3G/4G network.

As shown in FIG. 4, the other group of antennas of the terminal device is connected to the 5G FEM, and is configured to receive or send a signal of a 5G network. For ease of understanding, the group of antennas may be denoted as a 5G antenna. The 5G antenna includes at least one antenna. For example, as shown in FIG. 4, the 5G antenna includes four antennas. In actual application, one of the four antennas may be selected to receive and send a signal of the 5G network, or more (for example, four) of the four antennas may be selected to receive and send a signal of the 5G network.

The terminal device determines, from the plurality of antennas according to an actual requirement, one or more antennas that need to be assisted as the first antenna unit.

For example, the user answers a call by using the terminal device, and browses a web page by using the terminal device. The terminal device answers the call by using the 2G network, and browses the web page by using the 5G network. When the 2G network is used to answer the call, two antennas are selected, for example, two antennas on the left of the 2G/3G/4G antenna in FIG. 4 are selected to transmit a signal of the 2G network. When the 5G network is used to browse the web page, one antenna is selected, for example, one antenna on the left of the 5G antenna in FIG. 4 is selected to transmit a signal of the 5G network. The terminal device determines, based on a signal overhead or a signal strength of the two signals, an antenna that needs to be assisted, and determines the antenna that needs to be assisted as the first antenna unit to be assisted. For example, when the terminal device uses the 2G network to answer the call and uses the 5G network to browse the web page, if the terminal device determines that the signal overhead of the 5G network is large, the terminal device determines that one antenna on the left of the 5G antenna is the first antenna unit to be assisted. It should be noted that the foregoing description is merely an example. For a specific manner in which the terminal device determines the first antenna unit to be assisted, refer to the following specific descriptions in embodiments in FIG. 7 and FIG. 13.

S102: The terminal device transmits target information by using the RIS module and the first antenna unit.

Based on S101, after determining the first antenna unit to be assisted, the terminal device uses the RIS module to assist the first antenna unit in transmitting the target information. For example, if the target information is an uplink signal, the terminal device sends the target information to the network device by using the RIS module and the first antenna unit, to improve reliability of sending the target information. If the target information is a downlink signal, the terminal device receives the target information from the network device by using the RIS module and the first antenna unit, to improve reliability of receiving the target information.

In some embodiments, as shown in FIG. 4, the terminal device in this embodiment of this application further includes the RIS switch. In this case, the process in which the terminal device transmits the target information by using the RIS module and the first antenna unit in S102 may include step A1 and step A2.

Step A1: The terminal device connects the RIS module to the first antenna unit by controlling the RIS switch.

Specifically, as shown in FIG. 4, one end of the RIS switch is connected to the RIS module. If the first antenna unit belongs to the 2G/3G/4G antenna, the processor controls the other end of the RIS switch to switch to the 2G/3G/4G FEM for connection, so that the RIS module is connected to the first antenna unit. If the first antenna unit belongs to the 5G antenna, the processor controls the other end of the RIS switch to switch to the 5G FEM for connection, so that the RIS module is connected to the first antenna unit.

Step A2: The terminal device transmits the target information by using the RIS module and the first antenna unit that are connected.

After the RIS module and the first antenna unit are connected, the terminal device sends or receives the target information by using the RIS module and the first antenna unit that are connected. For example, the terminal device performs joint beamforming on a channel of the RIS module and a channel of the first antenna unit to transmit the target information, to improve transmission reliability of the target information.

In some other embodiments, the process in which the terminal device transmits the target information by using the RIS module and the first antenna unit in S102 may include step B1 and step B2.

Step B1: The terminal device radiates, by controlling the first antenna unit, a signal to point to the RIS module.

Step B2: The terminal device transmits the target information by using the RIS module and the first antenna unit that are connected.

Specifically, as shown in FIG. 3, the RIS module includes the plurality of RIS units. The terminal device enables, by controlling the amplitude and/or the phase of each RIS unit, the RIS module to perform beamforming on an incident signal to point to a receive end. A reflection feature of the RIS can be used to generate another transmission channel, to improve a signal strength of the receive end. Then, the terminal device sends, by using the RIS module and the first antenna unit that are connected, the target information obtained through modulation processing.

According to the information transmission method provided in this embodiment of this application, the RIS module is disposed in the terminal device. In an information transmission process, the terminal device determines the first antenna unit to be assisted, and uses the RIS module to assist the first antenna unit in transmitting the target information. Because the RIS module generates an additional transmit beam or receive beam, uplink or downlink signal quality of the terminal device is improved, so that uplink and downlink transmission performance of the terminal device is improved.

In this embodiment of this application, there are two working modes of the terminal device. A first working mode is that the terminal device works in a multi-connection mode, and a second working mode is that the terminal device works in a single-connection mode, that is, a non-multi-connection mode. Manners in which the terminal device determines, when the terminal device works in the multi-connection mode and in the single-connection mode, the first antenna unit to be assisted are different. With reference to specific embodiments, the following describes in detail information transmission processes of the terminal device when the terminal device works in different modes.

First, an information transmission process of the terminal device in the multi-connection mode is described with reference to FIG. 7.

Figure 7:
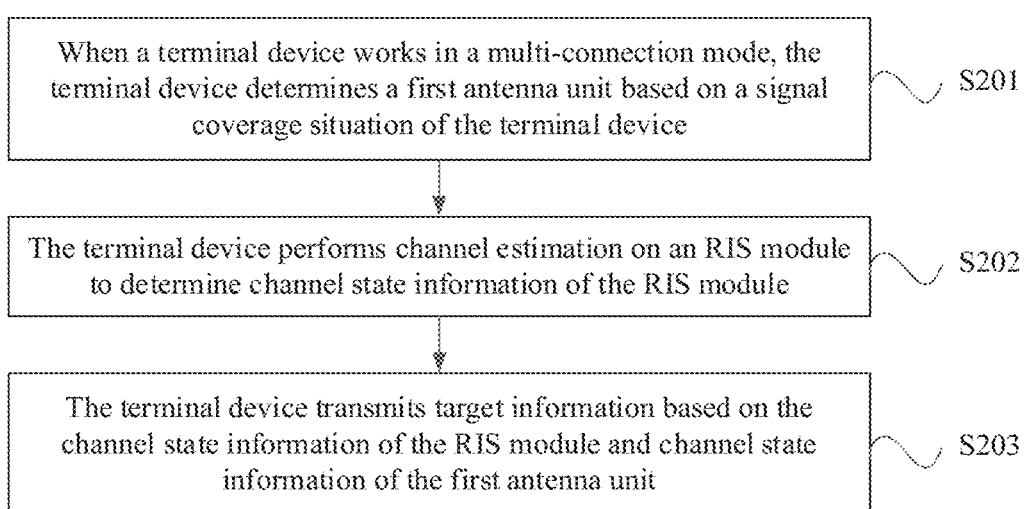
FIG. 7 is another schematic flowchart of an information transmission method according to an embodiment of this application.

FIG. 7 is another schematic flowchart of an information transmission method according to an embodiment of this application. As shown in FIG. 7, the method in this embodiment of this application includes the following steps.

S201: When the terminal device works in the multi-connection mode, the terminal device determines a first antenna unit based on a signal coverage situation of the terminal device.

Specifically, when the terminal device is in the multi-connection mode, for example, when the terminal device is in an EN-DC dual connectivity between LTE and NR, or when the terminal device is in an NN-DC dual connectivity between NR and NR, the terminal device determines, based on the signal coverage situation of the terminal device, for example, when the terminal device is in weak coverage or shielded, the first antenna unit to be assisted.

In some embodiments, when the terminal device works in the multi-connection mode, manners in which the terminal device determines the first antenna unit based on the signal coverage situation of the terminal device include but are not limited to the following.

Manner 1: When the terminal device is in weak coverage, the terminal device determines a working antenna that is farthest from the RIS module as the first antenna unit.

The working antenna described herein is an antenna in a working state. For example, as shown in FIG. 4, in an antenna selection process, if the terminal device selects an antenna on the left of the 5G antenna to transmit information, the antenna is a working antenna.

In this manner, the terminal device selects the working antenna that is farthest from the RIS module, so that a correlation between an RIS channel and an antenna channel is minimum. This can avoid both channels being very poor in weak coverage, so that uplink and downlink transmission performance of the terminal device is improved.

Manner 2: When the terminal device is shielded, the terminal device determines a working antenna whose beam is shielded as the first antenna unit.

The situation in which the terminal device is shielded may be that a beam of at least one working antenna of the terminal device is shielded.

In this manner, when the terminal device may control the RIS module to assist the antenna whose signal is shielded in transmitting a signal, signal transmission reliability can be improved, so that uplink and downlink transmission performance of the terminal device is improved.

Manner 3: When the terminal device is in non-weak coverage and is not shielded, the terminal device determines an antenna with a highest service priority as the first antenna unit. In this way, transmission reliability of a service with the highest priority can be improved.

S202: The terminal device performs channel estimation on the RIS module to determine channel state information of the RIS module.

In this embodiment of this application, manners in which the terminal device performs channel estimation on the RIS module to determine the channel state information of the RIS module include but are not limited to the following.

Figure 8:
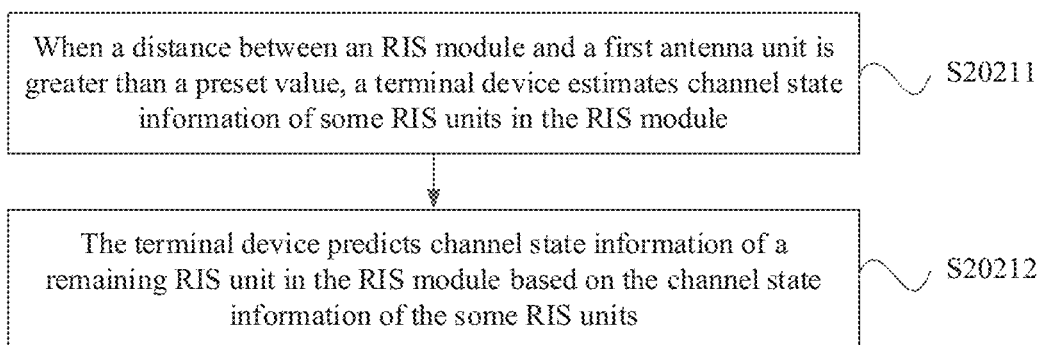
FIG. 8 is a schematic flowchart of a first channel estimation method according to an embodiment of this application.
Figure 9:
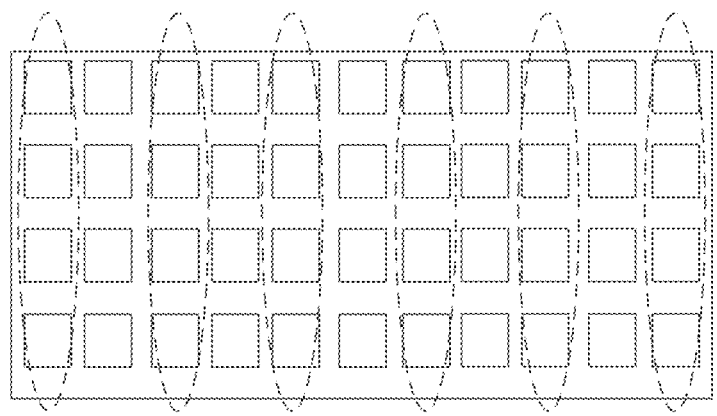
FIG. 9 is a schematic diagram of a structure of an RIS module according to an embodiment of this application.

Manner 1: As shown in FIG. 8 and FIG. 9, the terminal device estimates channel state information of a remaining RIS unit in the RIS module by using channel state information of some RIS units. In other words, S202 may include S20211 and S20212.

S20211: When a distance between the RIS module and the first antenna unit is greater than a preset value, the terminal device estimates the channel state information of the some RIS units in the RIS module.

Specifically, when the distance between the RIS module and the first antenna unit is greater than the preset value, the terminal device performs channel estimation by using a channel estimation method, for example, a minimum mean square error, to obtain the channel state information of the some RIS units in the RIS module.

In a possible implementation, that the terminal device estimates the channel state information of the some RIS units in the RIS module in S20211 may be: The terminal device controls, based on a preset estimation condition of the RIS unit, the some RIS units to be enabled, and estimates the channel state information of the enabled some RIS units. The preset estimation condition includes at least one of a communication frequency band, a moving speed of a user, and a sampling rate of the RIS module for a control signal.

Specifically, as shown in FIG. 9, it is assumed that the RIS module includes 4*11 RIS units, each RIS unit corresponds to one PIN diode, and different bias voltages are applied to the PIN diodes, so that the RIS units are in different states, for example, an on or off state. In a coherence time, the terminal device enables the some RIS units based on the preset estimation condition. For example, the terminal device may enable the RIS units by column in an inter-column manner. For example, in a first channel estimation timeslot, the RIS units in columns 1, 5, and 9 are enabled, and channel estimation is performed by using a conventional channel estimation method, for example, the minimum mean square error, to obtain channel state information of the RIS units in the columns 1, 5, and 9. In a second channel estimation timeslot, the RIS units in columns 3, 7, and 11 are enabled to obtain channel state information of the RIS units in the columns 3, 7, and 11.

When more RIS units are enabled, the channel estimation is more accurate. However, when a channel estimation time is longer, a sampling rate of the RIS module for a control signal is higher. In this embodiment of this application, the terminal device controls, based on at least one of the communication frequency band, the moving speed of the user, and the sampling rate of the RIS module for the control signal, a quantity of RIS units to be enabled. For example, when the sampling rate of the RIS module for the control signal is high, the terminal device may enable more RIS units to perform direct channel estimation. For another example, when the moving rate of the user is low, the terminal device may enable a small quantity of RIS units to perform channel estimation.

S20212: The terminal device predicts the channel state information of the remaining RIS unit in the RIS module based on the channel state information of the some RIS units.

The remaining RIS unit is an RIS unit other than the RIS units in the RIS.

Because the RIS module includes a large quantity of RIS units, it takes a long time to perform channel estimation on each RIS unit in the RIS module. As a result, transmission efficiency of a system is affected. To resolve the technical problem, in this embodiment of this application, the channel state information of the some RIS units in the RIS module is estimated by using a conventional channel estimation method, and the channel state information of the remaining RIS unit is estimated by using the estimated channel state information of the some RIS units. Therefore, channel estimation workload can be reduced, and a channel estimation time can be reduced, so that transmission efficiency of the system is improved.

Figure 10:
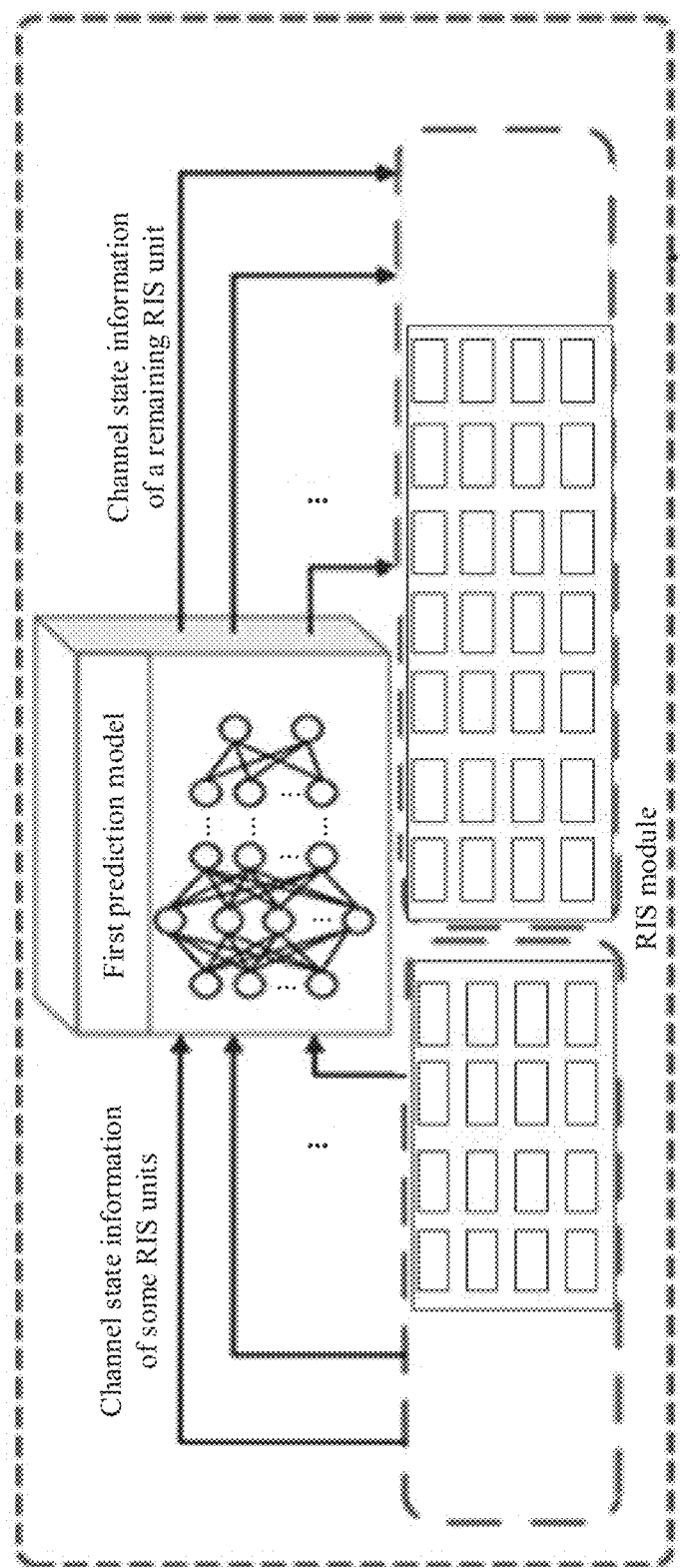
FIG. 10 is a schematic principle diagram of a first channel estimation method according to an embodiment of this application.

In some embodiments, that the terminal device predicts the channel state information of the remaining RIS unit in the RIS module based on the channel state information of the some RIS units may be: As shown in FIG. 10, the terminal device predicts the channel state information of the remaining RIS unit based on the channel state information of the some RIS units by using a first prediction model. The first prediction model is obtained by training based on history channel state information of the some RIS units and history channel state information of the remaining RIS unit.

Optionally, the first prediction model may be trained by the terminal device in advance. For example, the terminal device trains parameters in the first prediction model by using the history channel state information of the some RIS units and the history channel state information of the remaining RIS unit, to obtain the trained first prediction model.

Optionally, after the first predication model is trained by another electronic device in advance, the trained first prediction model is sent to the terminal device. For example, the another electronic device trains the parameters in the first prediction model by using the history channel state information of the some RIS units and the history channel state information of the remaining RIS unit, to obtain the trained first prediction model, and sends the trained first prediction model to the terminal device.

In an actual prediction process, the terminal device inputs the estimated channel state information of the some RIS units into the trained first prediction model, to predict the channel state information of the remaining RIS unit.

Optionally, a network structure of the first prediction model may be any conventional prediction network structure, for example, a circular network, a convolutional network, and a deep neural network. A specific network structure of the first prediction model is not limited in this embodiment of this application, and may be selected according to an actual requirement.

In this embodiment of this application, in addition to predicting the channel state information of the RIS module in the foregoing manner 1, the terminal device may alternatively predict the channel state information of the RIS module in the following manner 2.

Figure 11:
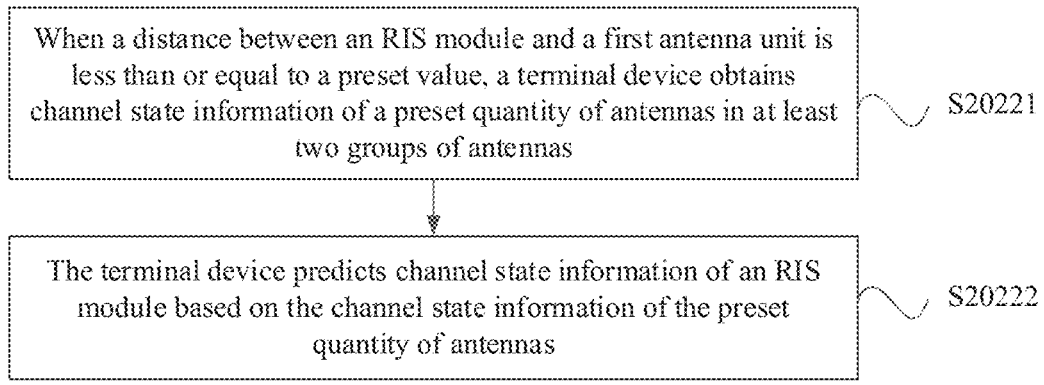
FIG. 11 is a schematic flowchart of a second channel estimation method according to an embodiment of this application.

Manner 2: As shown in FIG. 11, the terminal device estimates the channel state information of the RIS module by using channel state information of an antenna. Specifically, S202 may include S20221 and S20222.

S20221: When a distance between the RIS module and the first antenna unit is less than or equal to a preset value, the terminal device obtains channel state information of a preset quantity of antennas in the at least two groups of antennas.

Specifically, the terminal device estimates the channel state information of the preset quantity of antennas in the at least two groups of antennas by using the conventional channel estimation method. The preset quantity of antennas is determined based on an actual requirement. This is not limited in this embodiment of this application. For example, the preset quantity of antennas may be all antennas in the at least two groups of antennas in the terminal device, or may be some antennas in the at least two groups of antennas.

S20222: The terminal device predicts the channel state information of the RIS module based on the channel state information of the preset quantity of antennas.

In the terminal device, a quantity of antennas is less than a quantity of RIS units in the RIS module, so that a speed of antenna channel estimation is higher. The channel state information of the RIS module is predicted by using the channel state information of the antenna. The prediction process is simple and fast, so that a pilot frequency and a measurement overhead of the RIS are reduced, a time used by the RIS module for data transmission is increased, and a throughput of uplink and downlink transmission is increased.

In addition, in the antenna selection process, the terminal device originally needs to perform estimation on the channel state information of the antenna. In this way, the channel state information of the RIS module is predicted by using the channel state information of the antenna that originally needs to be estimated, so that unnecessary work of the terminal device can be reduced, and a prediction overhead of the terminal device can be reduced, to improve channel estimation efficiency of the terminal device.

Figure 12:
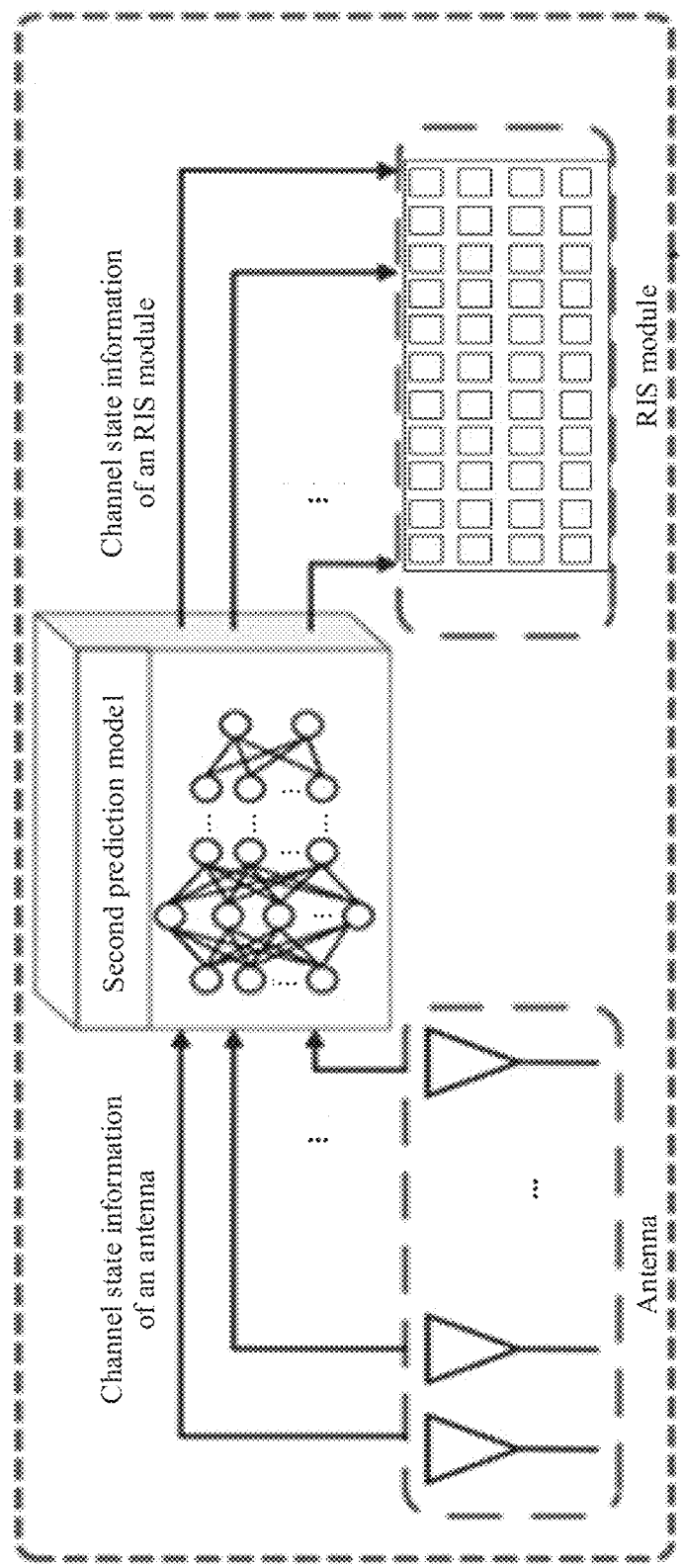
FIG. 12 is a schematic principle diagram of a second channel estimation method according to an embodiment of this application.

In some embodiments, that the terminal device predicts the channel state information of the RIS module based on the channel state information of the preset quantity of antennas may be: As shown in FIG. 12, the terminal device predicts the channel state information of the RIS module based on the channel state information of the preset quantity of antennas by using a second prediction model. The second prediction model is obtained by training based on history channel state information of the preset quantity of antennas and history channel state information of the RIS module.

Optionally, the second prediction model may be trained by the terminal device in advance. For example, the terminal device may train parameters in the second prediction model by using the history channel state information of the preset quantity of antennas and the history channel state information of the RIS module, to obtain the trained second prediction model.

Optionally, after the second predication model is trained by another electronic device in advance, the trained second prediction model is sent to the terminal device. For example, the another electronic device trains the parameters in the second prediction model by using the history channel state information of the preset quantity of antennas and the history channel state information of the RIS module, to obtain the trained second prediction model, and sends the trained second prediction model to the terminal device.

In an actual prediction process, the terminal device first estimates the channel state information of the preset quantity of antennas, and inputs the estimated channel state information of the preset quantity of antennas to the trained second prediction model, to predict the channel state information of the RIS module.

Optionally, a network structure of the second prediction model may be any conventional prediction network structure, for example, a circular network, a convolutional network, and a deep neural network. A specific network structure of the second prediction model is not limited in this embodiment of this application, and may be selected according to an actual requirement.

S203: The terminal device transmits target information based on the channel state information of the RIS module and channel state information of the first antenna unit.

Specifically, the terminal device performs channel estimation on the RIS module according to the method in S202, determines the channel state information of the RIS module, and estimates the channel state information of the first antenna unit by using the conventional channel estimation method. Then, the target information is transmitted based on the channel state information of the RIS module and the channel state information of the first antenna unit, for example, the target information is received or the target information is sent, so that transmission reliability of the target information and transmission performance of the terminal device are improved.

Figure 13:
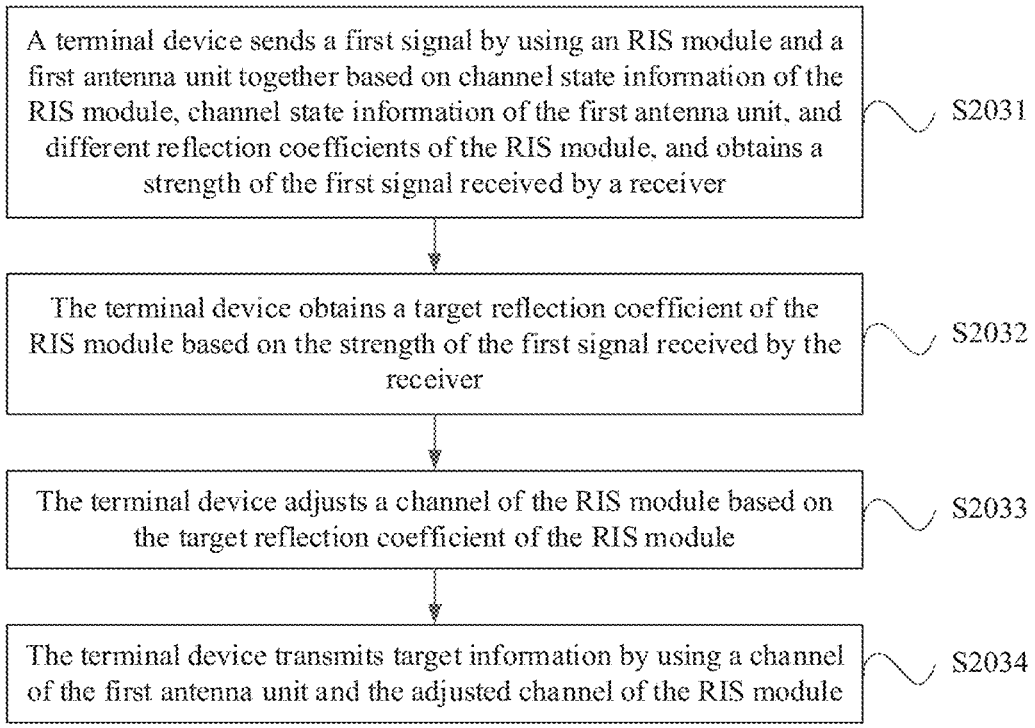
FIG. 13 is another schematic flowchart of an information transmission method according to an embodiment of this application.

In some embodiments, as shown in FIG. 13, that the terminal device transmits the target information based on the channel state information of the RIS module and the channel state information of the first antenna unit includes:

S2031: The terminal device sends a first signal by using the RIS module and the first antenna unit together based on the channel state information of the RIS module, the channel state information of the first antenna unit, and different reflection coefficients of the RIS module, and obtains a strength of the first signal received by a receiver.

The strength of the signal received by the receiver is related to the reflection coefficients of the RIS module.

The reflection coefficients of the RIS module include an amplitude and/or a phase of the RIS module, and transmission power of the RIS module may be changed by adjusting the reflection coefficient of the RIS module.

Optionally, when the RIS module is used to send a signal, the signal may be allocated to each RIS unit with equal power.

The following describes, by using an example, a process in which the terminal device adjusts the reflection coefficients of the RIS module to send the first signal.

For example, it is assumed that the RIS module has n different reflection coefficients, where n is a positive integer greater than or equal to 1. A correspondence between the first antenna unit, the reflection coefficients of the RIS module, and the strength of the first signal received by the receiver is shown in Table 1.

TABLE 1

| First antenna unit | Reflection coefficients of the RIS module | Strength of the first signal received by the receiver |
|---|---|---|
| First antenna unit | Reflection coefficient 1 | Strength 1 of the first signal |
| | Reflection coefficient 2 | Strength 2 of the first signal |
| | ... | ... |
| | Reflection coefficient n | Strength n of the first signal |

It can be learned from Table 1 that, the terminal device sends the first signal by using the RIS module and the first antenna unit together based on the channel state information of the RIS module, the channel state information of the first antenna unit, and different reflection coefficients of the RIS module, for example, the reflection coefficient 1 to the reflection coefficient n in Table 1, and obtains the strength of the first signal received by the receiver. For example, the first signal is sent by using the first antenna unit and the RIS module that uses the reflection coefficient 1 together, and the strength of the first signal received by the receiver is obtained, that is the strength 1; and the first signal is sent by using the first antenna unit and the RIS module that uses the reflection coefficient 2 together, and the strength of the first signal received by the receiver is obtained, that is the strength 2; and the like.

In an example, when the terminal device sends the first signal by using the RIS module and the first antenna unit together based on different reflection coefficients of the RIS module, a signal received by the receiver is shown in Formula (1):

$$y_i 1 = (\theta_i G_i + h_1^H) s_1 + z \tag{1}$$

$\theta_i$ is an $i^{th}$ reflection coefficient of the RIS module, $G_1$ is a channel from the RIS module to the receiver when the reflection coefficient is $\theta_i$, $h_1^H$ is a channel from the first antenna unit to the receiver, z is noise, s1 is the first signal, and $y_i$ is the signal received by the receiver when the terminal device sends the first signal s1 by using the first antenna unit and the RIS module whose reflection coefficient is $\theta_i$ together.

Correspondingly, a signal strength received by the receiver is shown in Formula (2):

$$\gamma_i = |\theta_i G_1 + h_1^H|^2 \tag{2}$$

$\gamma_i$ is the strength of the signal received by the receiver when the terminal device sends the first signal s1 by using the first antenna unit and the RIS module whose reflection coefficient is $\theta_i$ together.

It should be noted that Formula (1) and Formula (2) are merely examples. The signal received by the receiver in this embodiment of this application includes but is not limited to Formula (1), and correspondingly, the signal strength received by the receiver includes but is not limited to Formula (2).

In this step, the terminal device sends the first signal by continuously adjusting the reflection coefficients of the RIS module, and obtains the strength of the first signal received by the receiver.

S2032: The terminal device obtains a target reflection coefficient of the RIS module based on the strength of the first signal received by the receiver.

Specifically, the terminal device may obtain, based on the method in S2032, the strength of the first signal received by the receiver corresponding to each of different reflection coefficients of the RIS module. Then, the terminal device determines the target reflection coefficient of the RIS module based on the strength of the first signal received by the receiver. For example, the terminal device determines, as the target reflection coefficient, a reflection coefficient of the RIS module existing when the strength of the first signal received by the receiver is maximum.

S2033: The terminal device adjusts a channel of the RIS module based on the target reflection coefficient of the RIS module.

Specifically, the terminal device adjusts the channel of the RIS module based on the target reflection coefficient of the RIS module. For example, the terminal device controls the phase and/or the amplitude of the RIS module based on the target reflection coefficient of the RIS module, to generate a beam directed to the receiver (for example, a base station in communication). For another example, the terminal device performs joint beamforming on the RIS channel and a channel of the first antenna unit based on the target reflection coefficient of the RIS module.

S2034: The terminal device transmits the target information by using the channel of the first antenna unit and the adjusted channel of the RIS module.

In this embodiment of this application, the terminal device sends the first signal by continuously adjusting the reflection coefficients of the RIS module, and obtains the strength of the first signal received by the receiver for different reflection coefficients of the RIS module. Then, the terminal device obtains the target reflection coefficient of the RIS module based on the strength of the first signal received by the receiver, adjusts the channel of the RIS module by using the target reflection coefficient, and finally transmits the target information by using the channel of the first antenna unit and the adjusted channel of the RIS module, so that transmission performance of the terminal device is improved.

According to the information transmission method provided in this embodiment of this application, when the terminal device works in the multi-connection mode, the terminal device determines the first antenna unit based on the signal coverage situation of the terminal device, performs channel estimation on the RIS module to determine the channel state information of the RIS module, and finally transmits the target information based on the channel state information of the RIS module and the channel state information of the first antenna unit. In this way, when the terminal device works in the multi-connection mode, the RIS module assists the first antenna unit in transmitting the target information, so that transmission reliability of the target information and transmission performance of the terminal device in the multi-connection mode are improved.

The foregoing embodiment in FIG. 7 to FIG. 13 describes the information transmission process of the terminal device when the terminal device works in the multi-connection mode. Based on the foregoing embodiment, the following describes an information transmission process of the terminal device when the terminal device is in a single-connection mode with reference to FIG. 14.

Figure 14:
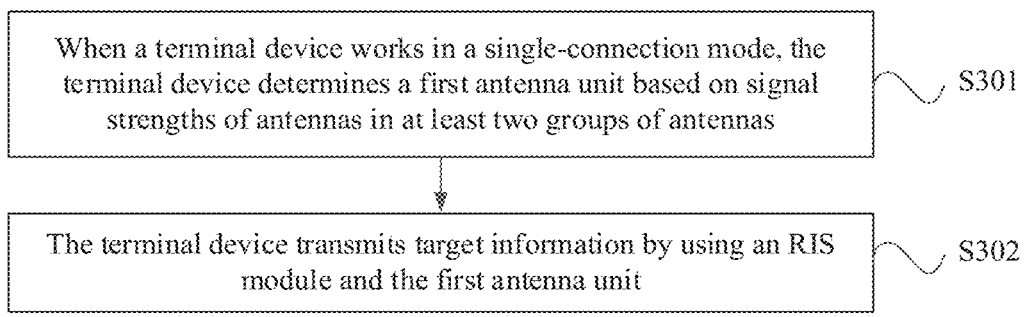
FIG. 14 is another schematic flowchart of an information transmission method according to an embodiment of this application.

FIG. 14 is another schematic flowchart of an information transmission method according to an embodiment of this application. As shown in FIG. 14, the method in this embodiment of this application includes the following steps.

S301: When the terminal device works in the single-connection mode, the terminal device determines a first antenna unit based on a signal strength of antennas in the at least two groups of antennas.

Specifically, when the terminal device works in the single-connection mode, the terminal device determines, based on an antenna selection, the first antenna unit to be assisted.

For example, the terminal device determines an antenna whose signal strength meets a preset value in the at least two groups of antennas as the first antenna. The preset value is determined based on an actual requirement. This is not limited in this embodiment of this application. Optionally, the terminal device determines an antenna having a greatest signal strength as the first antenna unit.

Figure 15:
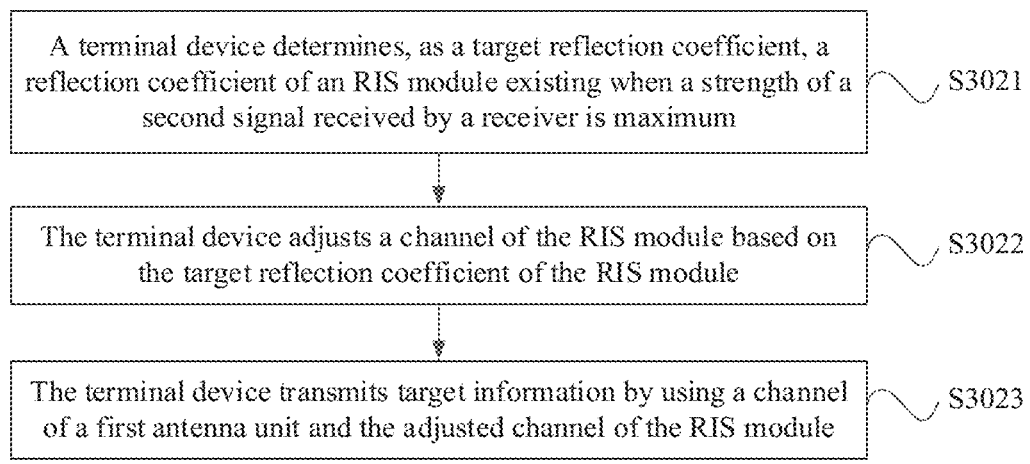
FIG. 15 is a schematic flowchart of a method for determining a first antenna unit according to an embodiment of this application.

In some embodiments, as shown in FIG. 15, that the terminal device determines the first antenna unit based on signal strengths of antennas in the at least two groups of antennas in S301 may include S3011 to S3013.

S3011: The terminal device performs channel estimation on the RIS module to determine channel state information of the RIS module.

An implementation process of S3011 is basically the same as an implementation process of S202. Refer to the specific description of S202. Details are not described herein again.

S3012: The terminal device sends a second signal by using the RIS module and different second antenna units together based on the channel state information of the RIS module, channel state information of the different second antenna units, and different reflection coefficients of the RIS module, and obtains a strength of the second signal received by a receiver.

The second antenna unit includes at least one antenna in any group of antennas.

For example, it is assumed that the second antenna unit has m different selections, and the RIS module has n different reflection coefficients, where both n and m are positive integers greater than or equal to 1. A correspondence between the second antenna unit, the reflection coefficients of the RIS module, and the strength of the second signal received by the receiver is shown in Table 2.

TABLE 2

| Second antenna unit | Reflection coefficients of the RIS module | Strength of the second signal received by the receiver |
|---|---|---|
| Second antenna unit 1 | Reflection coefficient 1 | Strength 11 of the second signal |
| | Reflection coefficient 2 | Strength 12 of the second signal |
| | ... | ... |
| | Reflection coefficient n | Strength 1n of the second signal |
| Second antenna unit 2 | Reflection coefficient 1 | Strength 21 of the second signal |
| | Reflection coefficient 2 | Strength 22 of the second signal |
| | ... | ... |
| | Reflection coefficient n | Strength 2n of the second signal |
| ... | ... | ... |
| Second antenna unit m | Reflection coefficient 1 | Strength m1 of the second signal |
| | Reflection coefficient 2 | Strength m2 of the second signal |
| | ... | ... |
| | Reflection coefficient n | Strength mn of the second signal |

It can be learned from Table 2 that, when the terminal device selects one second antenna unit, for example, the second antenna unit m, the terminal device obtains channel state information of the second antenna unit m based on a conventional channel estimation method. Then, the terminal device sends the second signal by using the IS module and the second antenna unit m together based on the channel state information of the RIS module, the channel state information of the second antenna unit m, and the different reflection coefficients of the RIS module, for example, the reflection coefficient 1 to the reflection coefficient n in Table 1, and obtains the strength of the second signal received by the receiver. For example, the second signal is sent by using the second antenna unit m and the RIS module that uses the reflection coefficient 1 together, and the strength m1 of the second signal received by the receiver is obtained; and the second signal is sent by using the second antenna unit m and the RIS module that uses the reflection coefficient 2 together, and the strength m2 of the second signal received by the receiver is obtained.

In an example, when the terminal device sends the second signal by using the RIS module and the different second antenna units together based on the channel state information of the RIS module, the channel state information of the different second antenna units, and the different reflection coefficients of the RIS module, a signal received by the receiver is shown in Formula (3):

$$y_{ji} = (\theta_{ji} G_{ji} + h_j^H) s_2 + z \qquad (3)$$

$\theta_{ji}$ is an $i^{th}$ reflection coefficient of the RIS module corresponding to a second antenna unit j, $G_{ji}$ is a channel from the RIS module to the receiver when the reflection coefficient is $\theta_{ji}$, $h_j^H$ is a channel from the second antenna unit j to the receiver, z is noise, and s2 is the second signal, and $y_{ji}$ is the signal received by the receiver when the terminal device sends the second signal s2 by using the second antenna unit j and the RIS module whose reflection coefficient is $\theta_{ji}$ together.

Correspondingly, a signal strength received by the receiver is shown in Formula (4):

$$\gamma_{ji} = |\theta_{ji} G_{ji} + h_j^H|^2 \qquad (4)$$

$\gamma_i$ is the strength of the signal received by the receiver when the terminal device sends the second signal s2 by using the second antenna unit j and the RIS module whose reflection coefficient is $\theta_{ji}$ together.

It should be noted that Formula (3) and Formula (4) are merely examples. The signal received by the receiver in this embodiment of this application includes but is not limited to Formula (3), and correspondingly, the signal strength received by the receiver includes but is not limited to Formula (4).

S3013: The terminal device determines, as the first antenna unit, a second antenna unit existing when the strength of the second signal is maximum.

It can be learned from Table 2 that, each second antenna unit corresponds to a plurality of strengths of the second signal received by the receivers, and the terminal device determines, as the first antenna unit, the second antenna unit existing when the strength of the second signal received by the receiver is maximum. For example, as shown in Table 2, there are m*n strengths of the second signal, and a maximum strength of the second signal is obtained from the m*n strengths. For example, if the maximum strength of the second signal is the strength 22 of the second signal, a second antenna unit corresponding to the strength 22 of the second signal is the second antenna unit 2. Therefore, the second antenna unit 2 is determined as the first antenna unit.

In this embodiment of this application, when the terminal device works in the single-connection mode, the terminal device determines the first antenna unit based on the method in S301 and S3011 to S3013.

S302: The terminal device transmits target information by using the RIS module and the first antenna unit.

Then, the terminal device transmits the target information by using the determined first antenna unit and the RIS module.

According to the method for determining the first antenna unit shown in FIG. 15, in S302, that the terminal device transmits the target information by using the determined first antenna unit and the RIS module may include steps S3021 to S3023.

S3021: The terminal device determines, as a target reflection coefficient, a reflection coefficient of the RIS module existing when the strength of the second signal received by the receiver is maximum.

S3022: The terminal device adjusts a channel of the RIS module based on the target reflection coefficient of the RIS module.

S3023: The terminal device transmits the target information by using a channel of the first antenna unit and the adjusted channel of the RIS module.

Specifically, still refer to Table 2. It is assumed that the terminal device sends the second signal by using the RIS module and the different second antenna units together based on the channel state information of the RIS module, the channel state information of the different second antenna units, and the different reflection coefficients of the RIS module, and a maximum value of the strengths of the second signal received by the receiver is the strength 22 of the second signal. A second antenna unit corresponding to the strength 22 of the second signal is the second antenna unit 2, and a corresponding reflection coefficient of the RIS module is the reflection coefficient 2. Therefore, the terminal device determines the second antenna unit 2 as the first antenna unit, and determines the reflection coefficient 2 as the target reflection coefficient. Then, the terminal device adjusts the channel of the RIS module by using the target reflection coefficient, and transmits the target information by using the channel of first antenna unit and the adjusted channel of the RIS module.

According to the information transmission method provided in this embodiment of this application, when the terminal device works in the single-connection mode, the terminal device determines the first antenna unit based on the signal strength of the antenna. Specifically, the terminal device performs channel estimation on the RIS module, to determine the channel state information of the RIS module, sends the second signal by using the RIS module and the different second antenna units together based on the channel state information of the RIS module, the channel state information of the different second antenna units, and the different reflection coefficients of the RIS module, and obtains the signal strength received by the receiver. Then, the terminal device determines, as the first antenna unit, the second antenna unit existing when the strength of the signal received by the receiver is maximum. In addition, the terminal device determines, as the target reflection coefficient, the reflection coefficient of the RIS module existing when the strength of the second signal is maximum, adjusts the channel of the RIS module based on the target reflection coefficient of the RIS module, and transmits the target information by using the channel of the first antenna unit and the adjusted channel of the RIS module. That is, in this embodiment of this application, when the terminal device works in the single-connection mode, the first antenna unit is determined based on the signal strength of the antenna, and the RIS module is used to assist the first antenna unit in uplink transmission, so that transmission performance of the terminal device in the single-connection mode is improved.

Figure 16:
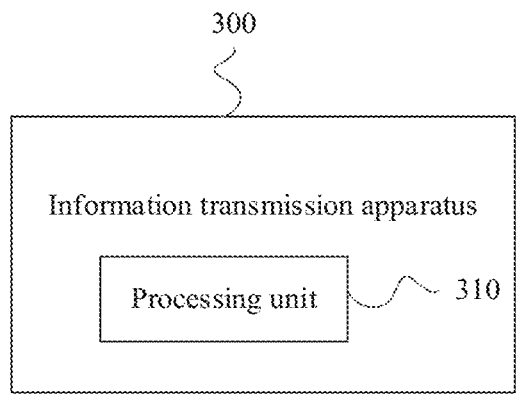
FIG. 16 is a schematic diagram of a structure of an information transmission apparatus according to an embodiment of this application.

FIG. 16 is a schematic diagram of a structure of an information transmission apparatus according to an embodiment of this application. The information transmission apparatus may be a terminal device, or may be a component (for example, an integrated circuit or a chip) of a terminal device. As shown in FIG. 16, the information transmission apparatus 300 may include a processing unit 310.

The processing unit 310 is configured to: determine a first antenna unit to be assisted, and transmit target information by using an RIS module and a first antenna unit. The first antenna unit includes at least one antenna in any group of antennas.

In a possible implementation, the processing unit 310 is specifically configured to: when the terminal device works in a multi-connection mode, determine the first antenna unit based on a signal coverage situation of the terminal device.

In a possible implementation, the processing unit 310 is specifically configured to: when the terminal device is in weak coverage, determine a working antenna that is farthest from the RIS module as the first antenna unit; or when the terminal device is shielded, determine a working antenna whose beam is shielded as the first antenna unit, where the shielding situation is that a beam of at least one working antenna of the terminal device is shielded; or when the terminal device is in non-weak coverage and is not shielded, determine an antenna with a highest service priority as the first antenna unit.

In a possible implementation, the processing unit 310 is specifically configured to: perform channel estimation on the RIS module to determine channel state information of the RIS module; and transmit the target information based on the channel state information of the RIS module and channel state information of the first antenna unit.

In a possible implementation, the processing unit 310 is specifically configured to: send a first signal by using the RIS module and the first antenna unit together based on the channel state information of the RIS module, the channel state information of the first antenna unit, and different reflection coefficients of the RIS module, and obtain a strength of the first signal received by a receiver; obtain a target reflection coefficient of the RIS module based on the strength of the first signal received by the receiver; adjust a channel of the RIS module based on the target reflection coefficient of the RIS module; and transmit the target information by using a channel of the first antenna unit and the adjusted channel of the RIS module. The strength of the signal received by the receiver is related to the reflection coefficients of the RIS module.

In a possible implementation, the processing unit 310 is specifically configured to determine, as the target reflection coefficient, a reflection coefficient of the RIS module existing when the strength of the first signal is maximum.

In a possible implementation, the processing unit 310 is specifically configured to: when the terminal device works in a single-connection mode, determine the first antenna unit based on signal strengths of antennas in the at least two groups of antennas.

In a possible implementation, the processing unit 310 is specifically configured to: perform channel estimation on the RIS module to determine channel state information of the RIS module; and send a second signal by using the RIS module and different second antenna units together based on the channel state information of the RIS module, channel state information of the different second antenna units, and different reflection coefficients of the RIS module, and obtain a strength of the second signal received by a receiver, where the second antenna unit includes at least one antenna in any group of antennas; and determine, as the first antenna unit, a second antenna unit existing when the strength of the second signal is maximum.

In a possible implementation, the processing unit 310 is specifically configured to: determine, as the target reflection coefficient, a reflection coefficient of the RIS module existing when the strength of second signal is maximum; adjust the channel of the RIS module based on the target reflection coefficient of the RIS module; and transmit the target information by using the channel of the first antenna unit and the adjusted channel of the RIS module.

In a possible implementation, the processing unit 310 is specifically configured to: when a distance between the RIS module and the first antenna unit is greater than a preset value, estimate channel state information of some RIS units in the RIS module, where the RIS module includes a plurality of RIS units; and predict channel state information of a remaining RIS unit in the RIS module based on the channel state information of the some RIS units, where the remaining RIS unit is an RIS unit other than the RIS units in the RIS.

In a possible implementation, the processing unit 310 is specifically configured to: control, based on a preset estimation condition of the RIS unit, the some RIS units to be enabled, and estimate the channel state information of the enabled some RIS units. The preset estimation condition includes at least one of a communication frequency band, a moving speed of a user, and a sampling rate of the RIS module for a control signal.

In a possible implementation, the processing unit 310 is specifically configured to predict the channel state information of the remaining RIS unit based on the channel state information of the some RIS units by using a first prediction model. The first prediction model is obtained by training based on history channel state information of the some RIS units and history channel state information of the remaining RIS unit.

In a possible implementation, the processing unit 310 is specifically configured to: when the distance between the RIS module and the first antenna unit is less than or equal to the preset value, obtain channel state information of a preset quantity of antennas in the at least two groups of antennas; and predict the channel state information of the RIS module based on the channel state information of the preset quantity of antennas.

In a possible implementation, the processing unit 310 is specifically configured to predict the channel state information of the RIS module based on the channel state information of the preset quantity of antennas by using a second prediction model. The second prediction model is obtained by training based on history channel state information of the preset quantity of antennas and history channel state information of the RIS module.

In a possible implementation, the terminal device further includes an RIS switch, and the processing unit 310 is specifically configured to: enable, by controlling the RIS switch, the RIS module to be connected to the first antenna unit; and transmit the target information by using the RIS module and the first antenna unit that are connected.

In a possible implementation, the terminal device further includes at least two front-end modules, each front-end module is connected to a group of antennas, and the processing unit 310 is specifically configured to: be connected, by controlling the RIS switch, to a front-end module corresponding to the first antenna unit, so that the RIS module is connected to the first antenna unit; and transmit the target information by using the RIS module and the first antenna unit that are connected.

The information transmission apparatus in this embodiment of this application may be configured to execute the technical solutions of the terminal device in the foregoing method embodiments. Implementation principles and technical effects thereof are similar, and details are not described herein again.

Figure 17:
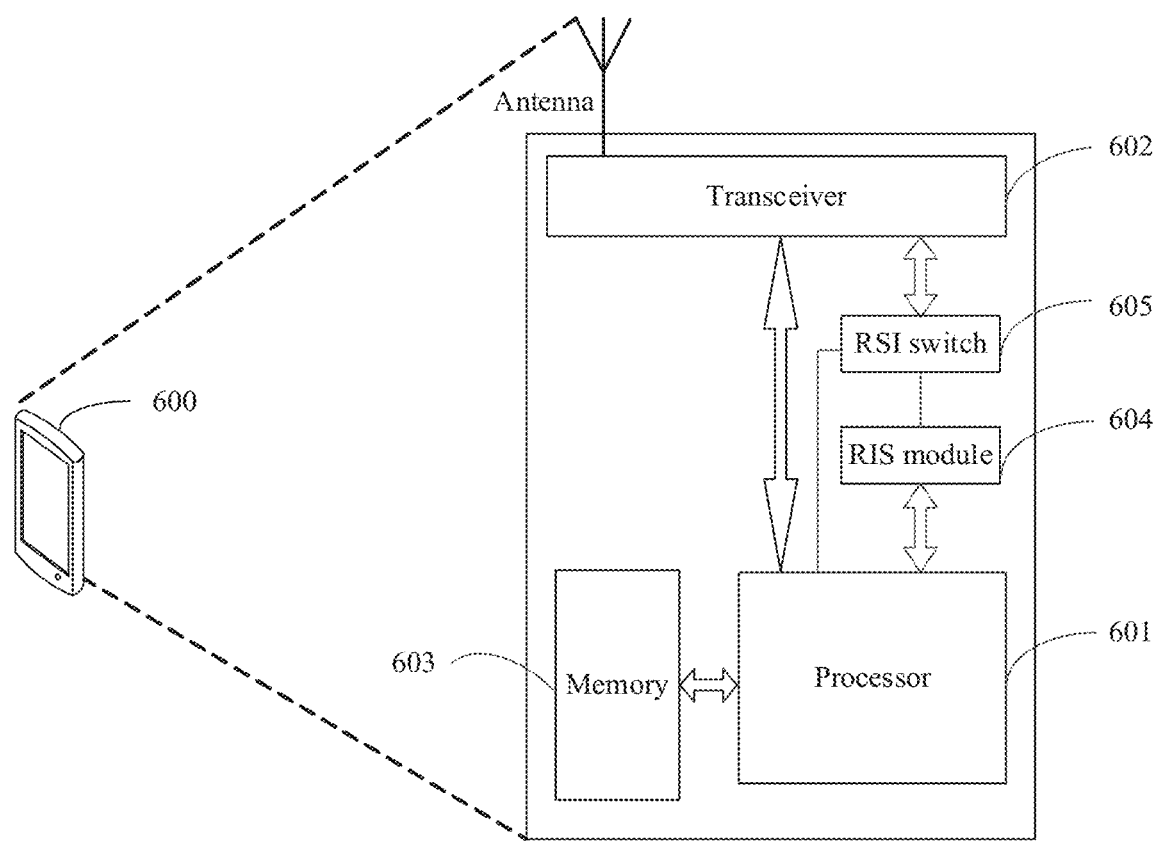
FIG. 17 is a schematic diagram of a structure of a terminal device according to an embodiment of this application.

FIG. 17 is a schematic diagram of a structure of a terminal device according to an embodiment of this application. The terminal device 600 may implement functions performed by the terminal device in the foregoing method embodiments. The functions may be implemented by hardware, or may be implemented by hardware executing corresponding software. The hardware or software includes one or more modules or units corresponding to the foregoing functions.

In a possible design, the structure of the terminal device 600 includes a processor 601, a transceiver 602, a memory 603, an RIS module 604, and at least two groups of antennas. The processor 601 is configured to support the terminal device 600 in performing a corresponding function in the foregoing method. The transceiver 602 is configured to support communication between the terminal device 600 and another terminal device or a network device. The terminal device 600 may further include the memory 603. The memory 603 is configured to be coupled to the processor 601, and stores program instructions and data that are necessary for the terminal device 600.

After the terminal device 600 is powered on, the processor 601 may read the program instructions and the data in the memory 603, interpret and execute the program instructions, and process data of the program instructions. When data is sent, after performing baseband processing on to-be-sent data, the processor 601 outputs a baseband signal to the transceiver 602. After performing radio frequency processing on the baseband signal, the transceiver 602 sends a radio frequency signal in an electromagnetic wave form by using an antenna (that is, a first antenna unit) and/or an RIS module. When data is sent to the terminal device, the transceiver 602 receives a radio frequency signal by using the antenna (that is, the first antenna unit) and/or the RIS module, converts the radio frequency signal into a baseband signal, and outputs the baseband signal to the processor 601. The processor 601 converts the baseband signal into data and processes the data.

Optionally, the terminal device further includes an RIS switch 605, and the processor 601 controls, by controlling the RIS switch 605, the RIS module 604 to be connected to the first antenna unit.

Optionally, the processor 110 may be a modem processor.

A person skilled in the art may understand that for ease of description, FIG. 17 shows only one memory 603 and only one processor 601. An actual terminal device 600 may have a plurality of processors 601 and a plurality of memories 603. The memory 603 may also be referred to as a storage medium, a storage device, or the like. This is not limited in this embodiment of this application.

The terminal device in this embodiment of this application may be configured to perform the technical solutions of the terminal device in the foregoing method embodiments. Implementation principles and technical effects thereof are similar, and details are not described herein again.

Figure 18:
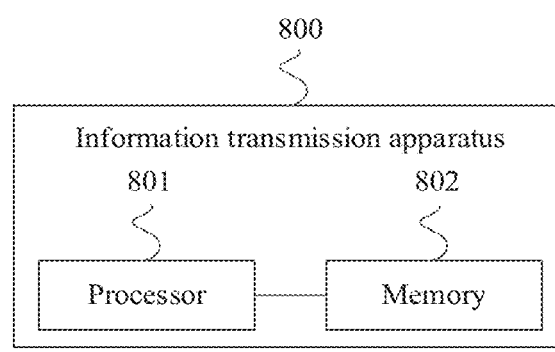
FIG. 18 is a schematic diagram of a structure of an information transmission apparatus according to an embodiment of this application.

FIG. 18 is a schematic diagram of a structure of an information transmission apparatus according to an embodiment of this application. The apparatus 800 exists in a product form of a chip. The structure of the apparatus includes a processor 801 and a memory 802. The memory 802 is configured to be coupled to the processor 801. The memory 802 stores program instructions and data that are necessary for the apparatus. The processor 801 is configured to execute the program instructions stored in the memory 802, so that the apparatus performs functions of the terminal device in the foregoing method embodiments.

The information transmission apparatus in this embodiment of this application may be configured to execute the technical solutions of the terminal device in the foregoing method embodiments. Implementation principles and technical effects thereof are similar, and details are not described herein again.

All or some of embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, procedures or functions according to embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk Solid-State Disk (SSD)), or the like.

A person skilled in the art may clearly understand that, for the purpose of convenient and brief description, for a detailed working process of the foregoing system, apparatus, and unit, refer to a corresponding process in the foregoing method embodiment. Details are not described herein again. In addition, the method embodiments and the apparatus embodiments may also be mutually referenced. Same or corresponding content in different embodiments may be mutually cited, and details are not described again.

What is claimed is:

1. An information transmission method implemented by a terminal device, wherein the information transmission method comprises:
   determining a first antenna to be assisted, wherein the terminal device comprises two groups of antennas, wherein each group of antennas comprises one antenna, and wherein the first antenna is in one of the two groups of antennas; and
   transmitting, by using a reconfigurable intelligent surface (RIS) module and the first antenna, target information.

2. The information transmission method of claim 1, wherein when the terminal device works in a multi-connection mode, determining the first antenna to be assisted comprises determining, based on a signal coverage situation of the terminal device, the first antenna.

3. The information transmission method of claim 2, wherein determining, based on the signal coverage situation of the terminal device, the first antenna comprises:
   determining a first working antenna that is farthest from the RIS module as the first antenna when the terminal device has weak coverage;
   determining a second working antenna as the first antenna when a beam of the second working antenna is shielded; or
   determining an antenna with a highest service priority as the first antenna when the terminal device is in non-weak coverage and does not have an antenna with a shielded beam.

4. The information transmission method of claim 2, wherein transmitting, by using the RIS module and the first antenna, the target information comprises:
   performing channel estimation on the RIS module to determine first channel state information of the RIS module; and
   transmitting, based on the first channel state information and second channel state information of the first antenna, the target information.

5. The information transmission method of claim 4, wherein transmitting, based on the first channel state information and the second channel state information, the target information comprises:
   sending, based on the first channel state information, the second channel state information, and reflection coefficients of the RIS module and by using the RIS module and the first antenna together, a signal;
   obtaining a strength of the signal received by a receiver, wherein the strength is related to the reflection coefficients;
   obtaining, based on the strength, a target reflection coefficient of the RIS module;

adjusting, based on the target reflection coefficient, a first channel of the RIS module to produce an adjusted channel; and transmitting, by using a second channel of the first antenna and the adjusted channel, the target information.

6. The information transmission method of claim 5, wherein obtaining, based on the strength, the target reflection coefficient of the RIS module comprises determining, as the target reflection coefficient, one of the reflection coefficients when the strength of the signal is maximum.

7. The information transmission method of claim 4, wherein performing the channel estimation on the RIS module to determine the first channel state information of the RIS module comprises:

estimating third channel state information of first RIS units in the RIS module when a distance between the RIS module and the first antenna is greater than a preset value, wherein the RIS module comprises a plurality of RIS units; and predicting, based on the third channel state information, fourth channel state information of a remaining RIS unit in the RIS module, wherein the remaining RIS unit is an RIS unit other than the first RIS units.

8. The information transmission method of claim 7, wherein estimating the third channel state information of the first RIS units in the RIS module when the distance between the RIS module and the first antenna is greater than the preset value comprises:

controlling, based on a preset estimation condition of the RIS module, the first RIS units to be enabled first RIS units; and estimating the fourth channel state information of the enabled first RIS units, wherein the preset estimation condition comprises at least one of a communication frequency band, a moving speed of a user, or a sampling rate of the RIS module for a control signal.

9. The information transmission method of claim 7, wherein predicting, based on the third channel state information, the fourth channel state information of the remaining RIS unit in the RIS module comprises predicting, based on the fourth channel state information and by using a prediction model, the fourth channel state information, and wherein the prediction model is based on history channel state information of the first RIS units and second history channel state information of the remaining RIS unit.

10. The information transmission method of claim 4, wherein performing the channel estimation on the RIS module to determine the first channel state information of the RIS module comprises:

obtaining third channel state information of a preset quantity of antennas in the two groups of antennas when a distance between the RIS module and the first antenna is less than or equal to a preset value; and predicting, based on the third channel state information, the first channel state information.

11. The information transmission method of claim 10, wherein predicting, based on the third channel state information, the first channel state information comprises predicting, based on the third channel state information and by using a prediction model, the first channel state information, and wherein the prediction model is based on first history channel state information of the preset quantity of antennas and second history channel state information of the RIS module.

12. The information transmission method of claim 1, wherein determining the first antenna to be assisted comprises determining, based on signal strengths of antennas in the two groups of antennas, the first antenna when the terminal device works in a single-connection mode.

13. The information transmission method of claim 12, wherein determining, based on the signal strengths of antennas in the two groups of antennas, the first antenna comprises:

performing channel estimation on the RIS module to determine first channel state information of the RIS module;

sending, based on the first channel state information, second channel state information of second antennas, and reflection coefficients of the RIS module and by using the RIS module and the second antennas, a signal;

obtaining a strength of the signal; and determining, as the first antenna, one of the second antennas when the strength is maximum.

14. The information transmission method of claim 13, wherein transmitting, by using the RIS module and the first antenna, the target information, comprises:

determining, as a target reflection coefficient, one of the reflection coefficients when the strength is maximum;

adjusting, based on the target reflection coefficient, a first channel of the RIS module to produce an adjusted channel; and transmitting, by using a second channel of the first antenna and the adjusted channel, the target information.

15. The information transmission method of claim 1, wherein the terminal device further comprises an RIS switch, and wherein transmitting, by using the RIS module and the first antenna, the target information comprises:

enabling, by controlling the RIS switch, the RIS module to be connected to the first antenna; and transmitting, by using the RIS module and the first antenna, the target information.

16. The information transmission method of claim 1, wherein transmitting, by using the RIS module and the first antenna, the target information comprises:

radiating, by controlling the first antenna, a signal to point to the RIS module; and transmitting, by using the RIS module and the first antenna, the target information.

17. A terminal device, comprising:

two groups of antennas configured to receive and send information, wherein each group of antennas comprises one antenna;

a reconfigurable intelligent surface (RIS) module configured to assist a first antenna in one of the two groups of antennas; and a processor coupled to the two groups of antennas and the RIS module and configured to:

determine to assist the first antenna; and transmit, by using the RIS module and the first antenna, target information.

18. The terminal device of claim 17, wherein when the terminal device works in a multi-connection mode, the processor is further configured to determine, based on a signal coverage situation of the terminal device, to assist the first antenna.

19. The terminal device of claim 18, wherein the processor is further configured to:

determine a working antenna that is farthest from the RIS module as the first antenna when the terminal device has weak coverage; and determine an antenna with a highest service priority as the first antenna when the terminal device is in non-weak coverage and is not shielded.

20. The terminal device of claim 17, wherein the terminal device further comprises an RIS switch, and wherein the processor is further configured to:

enable, by controlling the RIS switch, the RIS module to be connected to the first antenna, and transmit, by using the RIS module and the first antenna that are connected, the target information.

\* \* \* \* \*